US012768721B2

(12) United States Patent
Zou

(10) Patent No.: US 12,768,721 B2
(45) Date of Patent: Oct. 20, 2026

(54) APPARATUS AND METHOD FOR QUALIFYING LIGHT SOURCES FOR USE IN OPTICAL FIBER COMMUNICATIONS

(71) Applicant: ZyConn Corporation, Piscataway, NJ (US)

(72) Inventor: Weiyao Zou, Piscataway, NJ (US)

(73) Assignee: ZyConn Corporation, Piscataway, NJ (US)

( * ) Notice: Subject to any disclaimer, the term of this patent is extended or adjusted under 35 U.S.C. 154(b) by 1021 days.

(21) Appl. No.: 17/713,090

(22) Filed: Apr. 4, 2022

(65) Prior Publication Data

US 2022/0404210 A1 Dec. 22, 2022

Related U.S. Application Data

(60) Provisional application No. 63/146,537, filed on Feb. 5, 2021.

(51) Int. Cl.
*G01J 9/00* (2006.01)
*H04B 10/50* (2013.01)

(52) U.S. Cl.
CPC .............. *G01J 9/00* (2013.01); *H04B 10/501* (2013.01); *G01J 2009/002* (2013.01)

(58) Field of Classification Search
CPC ...... G01J 2009/002; G01J 9/00; H04B 10/501
See application file for complete search history.

(56) References Cited

U.S. PATENT DOCUMENTS

| | | | | |
|---|---|---|---|---|
| 6,377,344 B2 * | 4/2002 | Schoeppe | G02B 21/0064 | 359/615 |
| 7,390,999 B1 * | 6/2008 | Zou | G01J 9/00 | 356/121 |
| 7,525,076 B1 * | 4/2009 | Zou | G01J 9/00 | 356/121 |
| 7,619,191 B1 * | 11/2009 | Zou | G01J 9/00 | 359/849 |
| 2004/0156015 A1 * | 8/2004 | Campbell | A61B 3/103 | 351/205 |
| 2005/0286020 A1 * | 12/2005 | Campbell | A61B 3/103 | 351/205 |
| 2010/0141959 A1 * | 6/2010 | Kuchel | G01J 9/0215 | 356/521 |
| 2017/0059446 A1 * | 3/2017 | Maeda | G01J 9/00 | |
| 2017/0115180 A1 * | 4/2017 | Hirata | G02B 21/0076 | |

* cited by examiner

*Primary Examiner* — Sang H Nguyen

(57) ABSTRACT

An infrared wave front phase analyzer that can be used for measuring the wave front phase of laser diode (LD) beam to provide a quality characterization specification for the LD chips that are intended for use in optical sub-assemblies (OSAs), which has applications in optical transceiver manufacturing and fiber optic communications. An optical system mimics the OSA and includes optical elements to collect and collimate the LD output beam and to focus the collimated beam through a focus, which could otherwise be into the end of an optical fiber, before re-collimating the laser beam for evaluation by a wave front sensor. This imaging process measures a wave front of the output beam, yielding a quality specification of the LD for screening out the out-of-spec LDs in advance of their assembly within TOSA/BOSA manufacturing to lower production costs.

15 Claims, 32 Drawing Sheets

FIG. 18 shows the wave front astigmatism at 45° of Zernike polynomials

APPARATUS AND METHOD FOR QUALIFYING LIGHT SOURCES FOR USE IN OPTICAL FIBER COMMUNICATIONS

CROSS-REFERENCE TO RELATED PATENT APPLICATION

This Application claims benefit to provisional application 63/146,537, filed Feb. 5, 2021, the content of which is incorporated herein in the entirety by reference.

TECHNICAL FIELD

This present disclosure relates to the measurement of optical properties and, in particular, to apparatus and methods for characterizing the output beam of a semiconductor light source, such as a laser diode (LD) or a light-emitting-diode (LED), as well as other optical sources, particularly sources used for optical fiber communications (OFC) such as light sources for optical transceivers.

BACKGROUND

An example of a conventional laser diode is a compact Gallium Arsenide (GaAs) semiconductor laser. Following the disclosure of optical fiber, an important application of a laser diode has been its use as the light source of optical transmitters for optical fiber communications. The electrical signals for such transmission are first modulated into the diode laser output beam as optical signals, and the output beam is then coupled into one end of the optical fiber with a connector for further transmission along the optical fiber. The transmitted light exits from the other end of the optical fiber and is focused onto a receiver where the optical signals are converted back into electrical signals by a photo detector. Multiple optical fiber links, repeaters and amplifiers can be used for long-distance transmission.

A conventional optical transceiver comprises both a transmitter and a receiver within a single housing to share common circuitry. A typical optical transceiver contains Optical Sub-Assemblies (OSAs), including a Transmitter OSA (TOSA) and a Receiver OSA (ROSA). The TOSA is used to encode electrical signals as optical signals that are then coupled into an optical fiber. The TOSA typically contains a semiconductor light source, an optical interface, a monitor photodiode, a mechanical housing, and an electrical interface. The ROSA is used to receive optical signals from a fiber and decode it to electrical signals. The ROSA typically contains a semiconductor detector, an optical interface, a mechanical housing, and an electrical interface. To utilize the bandwidth of the optical fiber more efficiently, the transceiver can use Bidirectional Optical Sub-Assembly (BOSA) modules for bidirectional transmission over a single fiber. The BOSA can contain a TOSA, a ROSA, and a wavelength-division multiplexing (WDM) filter so that it can use bidirectional technology to support two or more wavelengths in each fiber. Both a TOSA and a BOSA are typically coupled to a semiconductor light source. TOSA and ROSA are major cost components of transceivers for data- and tele-communication (datacom and telecom) applications.

Telecom systems are generally used for high bit rate and long-distance communication, datacom systems are generally used for computer interconnects, telecom switching equipment and other high bandwidth-demanded applications, such as Fiber to the home (FTTH) using a passive optical network (PON). For high performance telecom systems, single-mode optical fibers are generally used, which requires high precision and mechanical stability of the packaging system. For datacom systems, the optical fiber can be either multimode or single mode. For short transmission distances, a multimode fiber with a shorter wavelength diode laser can be used; while for longer transmission distances, a single mode fiber with a longer wavelength can be used.

The semiconductor light source used for supplying light to a TOSA or a BOSA can be a LD (laser diode) or a LED (light-emitting diode), which typically operate at infrared bands conducive to fiber optic transmission. LEDs are known to produce wide-spectrum incoherent light subject to high optical dispersion, which can be used for low-cost local area network applications. LDs are generally more compact, efficient, and reliable, producing narrow-spectrum coherent light, which can be used for long-distance fiber-optic communications. LED sources emitting light at nominal wavelengths of 850 nm or 1300 nm can be used for short-distance multimode applications. LD sources emitting light at nominal wavelengths of 1310 nm or 1550 nm are generally used for single-mode applications. Distributed Feedback (DFB) lasers or Directly Modulated Laser (DML) diodes are mainly used for relatively lower speeds (≤25 Gbps) and shorter reaches (2-10 km). For higher speeds (≥25 Gbps, 40 Gbps) and longer reaches (10-40 km) telecom applications, Electro-Absorption Modulated Laser (EML) diodes are mainly used. An EML is a laser diode integrated with an electro-absorption modulator (EAM) in a single chip. Compared to a DML, an EML has smaller chromatic dispersion with a stable wavelength under high-speed operation. The LD lasers operating in wavelength bands, such as at 1310 nm, 1550 nm, 1577 nm, and 1610 nm, are commonly used on the market.

While a hermetic butterfly-style package is most common in telecom systems, a transistor outline can (TO-can) is the standard package in datacom systems. The TO-can provides hermetic sealing of the chip and OSA systems and thermo-electric cooler (TEC) plus some electronic circuits. Besides being used for fiber optic communications, LDs can be used as pumping sources for pumping solid state lasers, as well as in pumping optical fiber amplifiers, Light Detection And Ranging (LiDAR) systems, barcode readers, laser pointers, CD/DVD/Blu-ray disc reading and recording devices, laser printers, laser scanners, and light beam illumination devices. Tunable semiconductor lasers can also be used for optical sensing.

LD manufacturing involves complicated wafer processing, which includes incoming materials inspection, raw materials cleaning, metallization, solder deposition, die bonding, wire bonding, assembling, screening, before burn-in (BBI) test, burn in (BI), after burn-in (ABI) test, and final inspection. Any missteps in chip design, quality inspection, wafer processing operations or technologies used can produce out-of-specification (out-of-spec) LD chips.

Inconsistencies among operators and wafers can also contribute to variations in LD quality. How to identify these out-of-spec LD chips is a quality-control challenge that adds to production costs. With present technology, the out-of-spec LD chips are typically not identified until the final steps of optical packaging module production where the OSA performance is characterized for quality screening. This is expensive yet inefficient because the optical packaging costs are also wasted together with the costs of the out-of-spec LD chips. Given that the yield rate of the in-spec laser chips can be quite low, the manufacturing cost wasted by the scrapped finished items can be very high.

SUMMARY OF THE PRESENT DISCLOSURE

Various embodiments disclosed herein provide methods or apparatus to screen out the out-of-spec laser diodes as early as possible in production, so that only the in-spec laser diodes are moved to next step for optical packaging. In other words, laser diodes intended for use in optical packaging such as in TOSA or BOSA can be inspected and qualified for their intended use in advance of their assembly within such optical packaging, thereby saving cost and reducing waste.

Among the objectives that can be realized by various embodiments in whole or in part include characterizing one or more optical properties of laser diodes that are deemed relevant to the performance of the laser diodes within OSA packaging systems. For example, embodiments provide for measuring the wave front phase of a laser diode output beam in a form wherein the first part of a metrology system imitates the function of OSA packaging system to collect the laser beam emitted from the laser diode intended use in the OSA packaging system. In this regard, the laser output beam can be collimated for measurement of its wave front phase in a manner replicating the expected collimation of the laser output beam when assembled within an OSA packaging system. Aberrations such as astigmatism, coma, or spherical aberration, can be quantified from the wave front measurements to identify out-of-spec laser diodes so only qualified (i.e., in spec) laser diodes are advanced for assembly into OSA packaging systems.

Embodiments present a method or apparatus to measure wave front slopes (or wave front gradients) instead of or in addition to beam intensity to obtain wave front phase profile for diode laser beam characterization.

Embodiments present a method or apparatus to provide optical system configurations to imitate the OSA packaging system that use a large numerical aperture (NA) collimation lens to substantially collect the wave front of the diode laser output beam for measuring the true value of wave front phase. The measurement system can be arranged to collect the light emitting from the laser diode by a collimation lens to obtain a collimated beam, and focus the collimated beam into a focused point, just as the OSA packaging does for chip-fiber coupling, before the focused beam is re-collimated to a predetermined size for acceptance by a wave front sensor.

Embodiments present a method or apparatus using a Shack-Hartmann wave front sensor as the wave front sensor. The hardware of the wave front sensor can include a micro-lens array focusing onto a CCD detector. The Shack-Hartmann wave front sensor divides the wave front into many small sub-apertures, generating plural Hartman grid points, and measures the slope information in the x- and y-directions of the wave front phase, yielding wave front phase information by integration over the whole beam aperture.

Embodiments present a method or apparatus using a mechanical cartridge which has plural slots to hold the LD chips (CoC) and provide electrical charging for LD chips to emit infrared laser beams for wave front phase measurement. Translation stages and electro-optics devices can be used to adjust the position and orientations of the LD chips.

Embodiments present a method or apparatus using data processing software to provide wave front phase estimation and beam quality analysis. Further objects and advantages of this disclosure will be apparent from the following detailed description of preferred embodiments which are illustrated schematically in the accompanying drawings.

BREIF DESCRIPTION OF THE DRAWINGS

The accompanying drawings illustrate one or more embodiments of the present disclosure and, together with the written description, serve to explain the principles of the present disclosure, wherein:

FIGS. 3A-3D illustrate an exemplary optical quality of a TOSA packaging system at 1550 nm, wherein FIG. 3A shows an exemplary optical layout, FIG. 3B shows an exemplary wave front phase map, FIG. 3C shows an exemplary Point Spread Function (PSF) with a Strehl ratio of 0.891, and FIG. 3D shows an exemplary graph of enclosed energy, in accordance with an embodiment of the present disclosure;

FIGS. 5A-5C illustrate an exemplary configuration A of a wave front phase metrology system for a small Numerical Aperture (NA) laser diode, wherein FIG. 5A shows a first example of Configuration A, FIG. 5B shows a second example of Configuration A, and FIG. 5C shows a third example of Configuration A, in accordance with an embodiment of the present disclosure;

FIGS. 6A-6C illustrate an exemplary configuration B of a wave front phase metrology system for an intermediate NA laser diode, wherein FIG. 6A shows a first example of Configuration B, FIG. 6B shows a second example of Configuration B, and FIG. 6C shows a third example of Configuration B, in accordance with an embodiment of the present disclosure;

FIGS. 7A-7B illustrates an exemplary configuration C of a wave front phase metrology system for a large NA Laser diode, wherein FIG. 7A shows a first example of Configuration C and FIG. 7B shows a second example of Configuration C, in accordance with an embodiment of the present disclosure;

Figure 23:
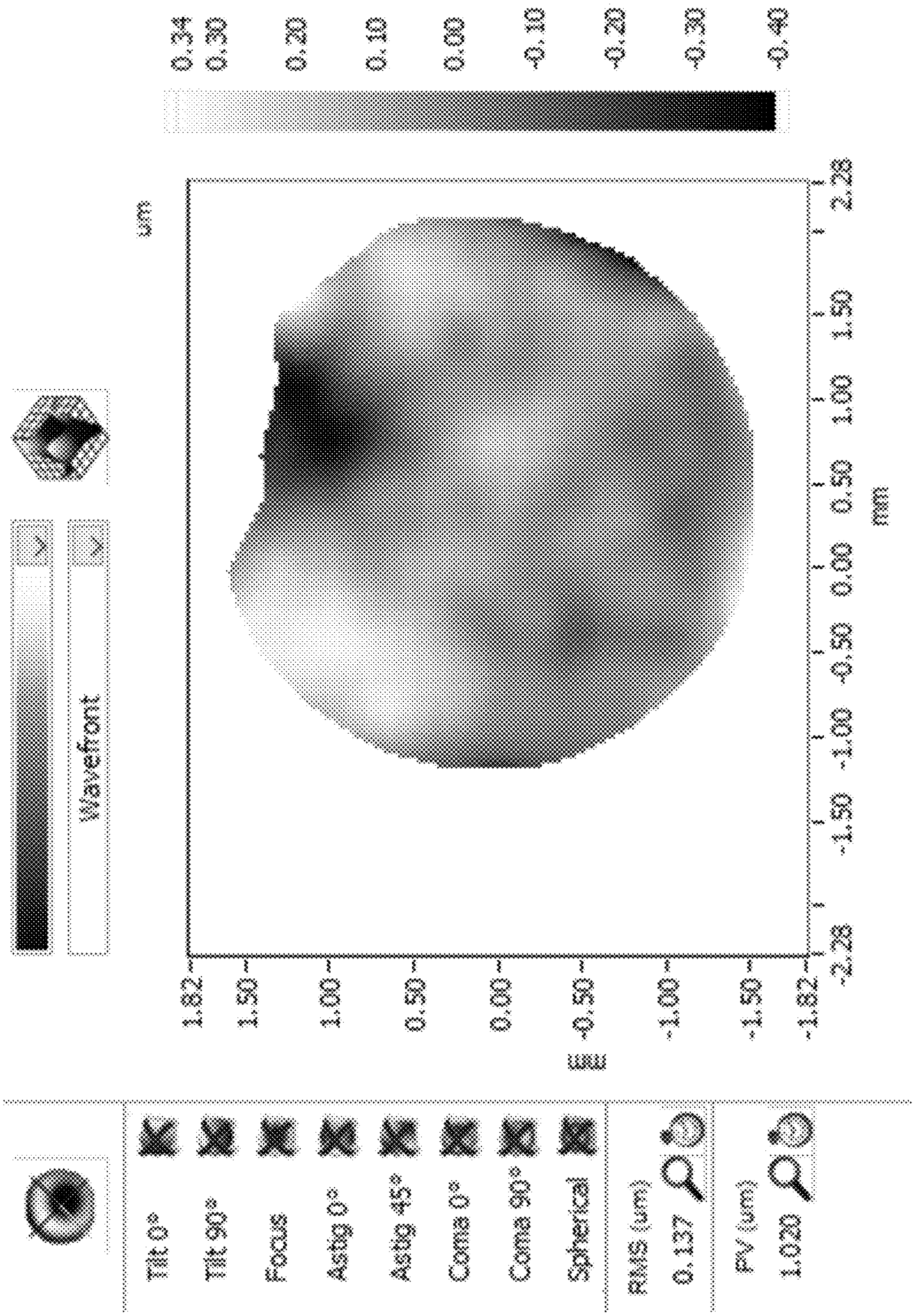
Figure 24:
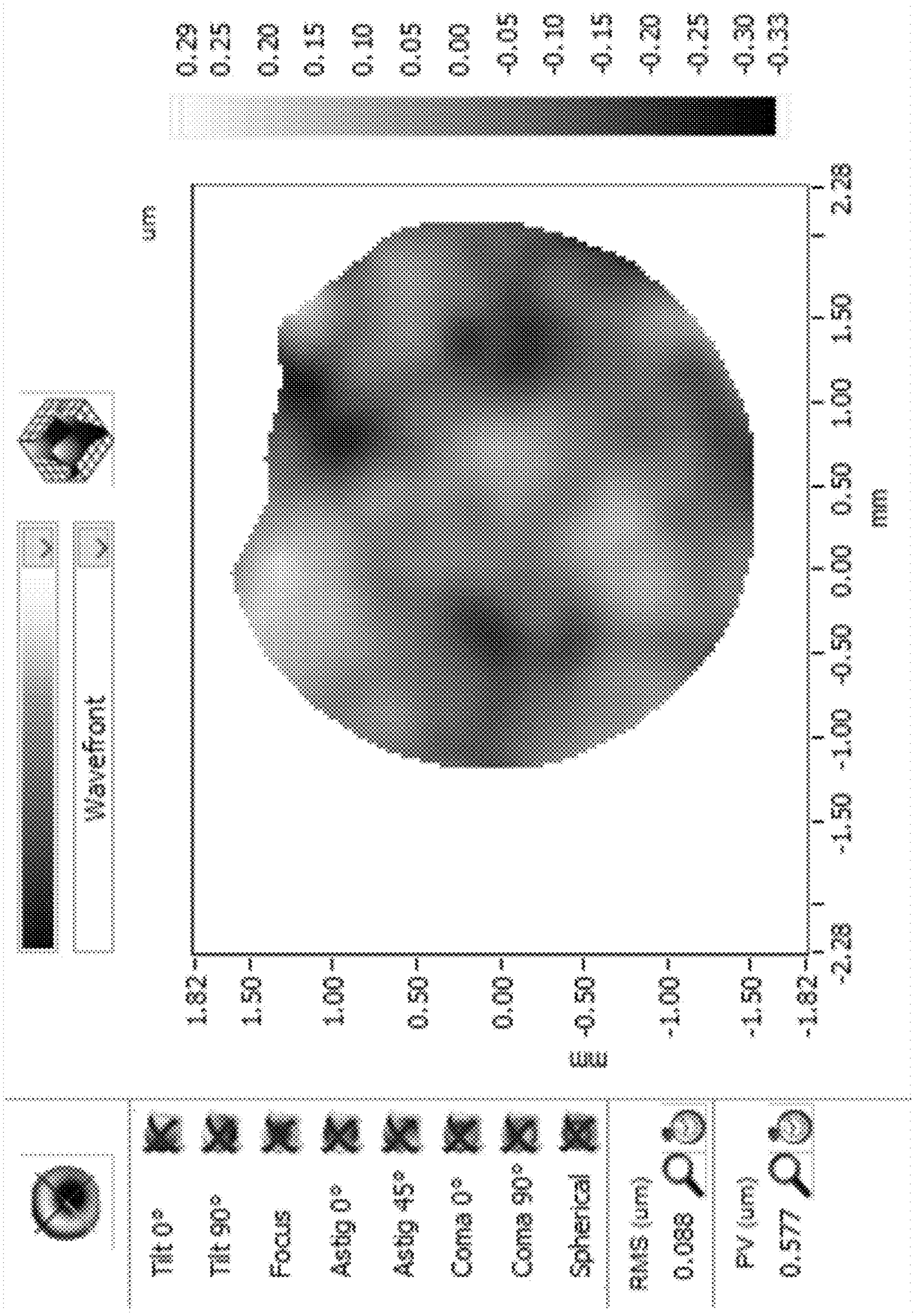

FIG. 23 illustrates an exemplary residual wave front error after 1-12 terms of Zernike polynomials are removed, which include the zonal wave front residual error after modal estimation, in accordance with an embodiment of the present disclosure; and FIG. 24 illustrates an exemplary zonal residual wave front error after modal estimation, which is a zonal residual error that cannot be modeled to Zernike coefficients, in accordance with an embodiment of the present disclosure.

The following is a list of the reference numbers used in the drawings and the detailed specification to identify components:

010: Laser diodes light source, 020: First lens, 030: Mirror, 040: Beamsplitter, 050: Microscope Objective lens, 060: Video camera, 070: Video Monitor, 080: Wave front sensor, 090: Computer, 110: DC power supply, 120: Power connector, 130: Mechanical cartridge containing Laser diode chips, 140: Collecting Lens A, 170: Collimation Lens C, 180: NIR Wave front sensor, 190: Computer, 111: DC power supply, 121: Power connector, 131: Mechanical cartridge containing Laser diode chips, 141: Collecting Lens A, 171: Collimation Lens C, 181: NIR Wave front sensor, 191: Computer, 112: DC power supply, 122: Power connector, 132: Mechanical cartridge containing Laser diode chips, 142: Collecting Lens A, 162: Field lens D, 172: Collimation Lens C, 182: NIR Wave front sensor, 192: Computer, 210: DC power supply, 220: Power connector, 230: Mechanical cartridge containing Laser diode chips, 240: First Lens A, 250: Focusing lens B, 270: Collimation Lens C, 280: NIR Wave front sensor, 290: Computer, 211: DC power supply, 221: Power connector, 231: Mechanical cartridge containing Laser diode chips, 241: First Lens A, 251: Focusing lens B, 271: Collimation Lens C, 281: NIR Wave front sensor, 291: Computer, 212: DC power supply, 222: Power connector, 232: Mechanical cartridge containing Laser diode chips, 239: Adjustment stage for Laser diode, 242: First Lens A, 249: Optical system for laser diode chip inspection, 252: Focusing lens B, 262: Field lens, 272: Collimation Lens C, 282: NIR Wave front sensor, 289: Adjustment stage for optical metrology system, 292: Computer, 310: DC power supply, 320: Power connector, 330: Mechanical cartridge holding laser diodes, 340: First Lens A, 350: Focusing lens B, 370: Collimation Lens C, 380: NIR Wave front sensor, 390: Computer, 311: DC power supply, 321: Power connector, 331: Mechanical cartridge holding laser diodes, 341: First Lens A, 351: Focusing lens B, 371: Collimation Lens C, 381: NIR Wave front sensor, 391: Computer, 410: Mechanical cartridge slot, and 420: Laser diode chip.

DETAILED DESCRIPTION

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the present disclosure to those skilled in the art. Like reference numerals refer to like elements throughout.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the present disclosure or of any exemplified term. Likewise, the present disclosure is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms Firstly, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present disclosure.

It is understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It is also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the present disclosure. As used herein, the singular forms "a," "an," and "the" are intended to include the multiple forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements will then be oriented on the "upper" sides of the other elements. The exemplary term "lower" can, therefore, encompass both an orientation of lower and upper, depending on the particular orientation of the figure. Similarly, for the terms "horizontal", "oblique" or "vertical", in the absence of other clearly defined references, these terms are all relative to the ground. Similarly, if the device in one of the figures is turned over, elements described as "below" or "beneath" other elements will then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially," "generally" or "approximately" shall generally mean within 20 percent, preferably within 10 percent, and more preferably within 5 percent of a given value or range. Numerical quantities given herein are approximate, meaning that the terms "around," "about," "substantially," "generally" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

Embodiments of the present disclosure are illustrated in detail hereinafter with reference to accompanying drawings. It should be understood that specific embodiments described herein are merely intended to explain the present disclosure, but not intended to limit the present disclosure.

In order to further elaborate the technical means adopted by the present disclosure and its effect, the technical scheme of the present disclosure is further illustrated in connection with the drawings and through specific mode of execution, but the present disclosure is not limited to the scope of the implementation examples.

Conventional laser diodes generally comprise a laser chip, a bonding solder, a mounting substrate and a heat sink. The typical size of an LD is about a few 100s microns. Two tiny pads connected by wire bonding are generally used for an electrical cathode and anode. The laser chip can be mounted over the mounting substrate via a bonding solder, and a heat sink can be attached underneath for the mechanical base as well as for heat dissipation. For optical transceivers, the Chip-on-Carrier/Submount (CoC/CoS) bonding is typically done first. Then, the CoC/CoS is bonded onto a common baseplate for lens/mirror attachment before putting it into a package. The latest trend is for more components such as the lasers, capacitors, and thermistors to be attached onto a common carrier by either eutectic or epoxy die bonding.

Figure 1:
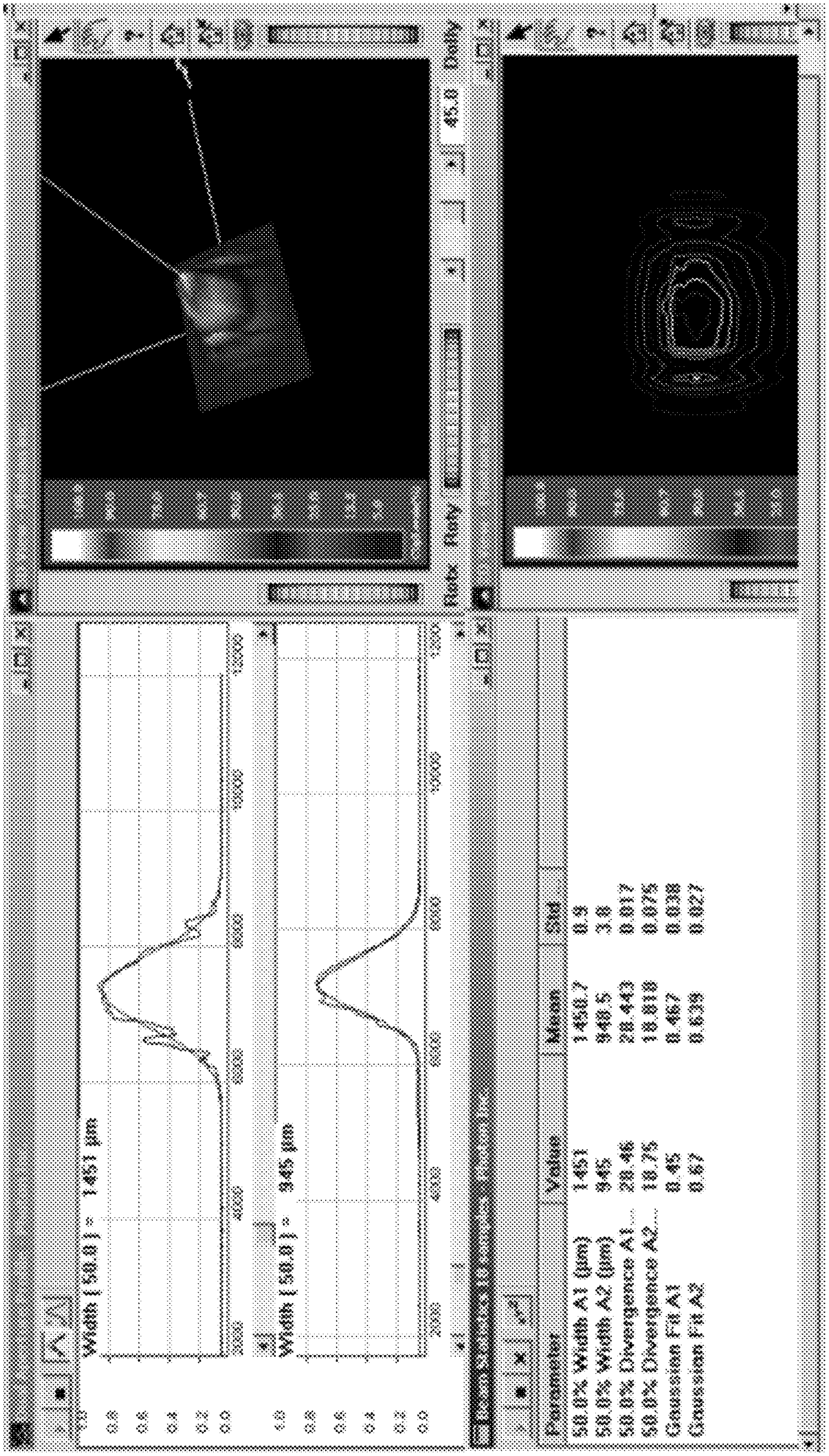
FIG. 1 illustrates an exemplary intensity profile measured by an Ophir Goniometric Radiometer LD 8900 Far-Field Profiler, in accordance with an embodiment of the present disclosure.

As an edge emitter, the dimensions of active layer in the vertical and lateral directions are usually unequal, which causes the diode laser to emit beams having wave fronts with unequal curvatures in the two orthogonal directions normal to the direction of propagation. Thus, the laser beam generally has an inherent aberration of astigmatism. The far field beam divergence, defined by the full angle at the half maximum (FWHM) of the intensity peak, is typically at 25-30 degrees vertically by 15-20 degrees laterally. As shown in FIG. 1, for example, for a 10 G TEML laser diode, the far field angle is about 28 degrees in Horizontal direction and 19 degrees (FWHM) in vertical direction. Using traditional symmetrical lenses to collimate the emitting light, the collimated beam usually ends up being elliptical in shape. For the gain guided diode laser, the astigmatism difference could be up to about 30 μm. The elliptical aberrated output beam from the edge emitting LD can significantly degrade the coupling efficiency to the fiber.

However, in a refractive index-guided diode laser, such as the guiding in Buried-Hetero (BH) or the Etched-Mesa Buried-Hetero (EMBH) structure lasers diodes, the emission laser wave front tends to have smaller differences between the two angles in two perpendicular directions than the gain-guided laser diodes. Due to the design as well as processing errors, a certain amount of wave front astigmatism still exists in most of products.

Figure 2:
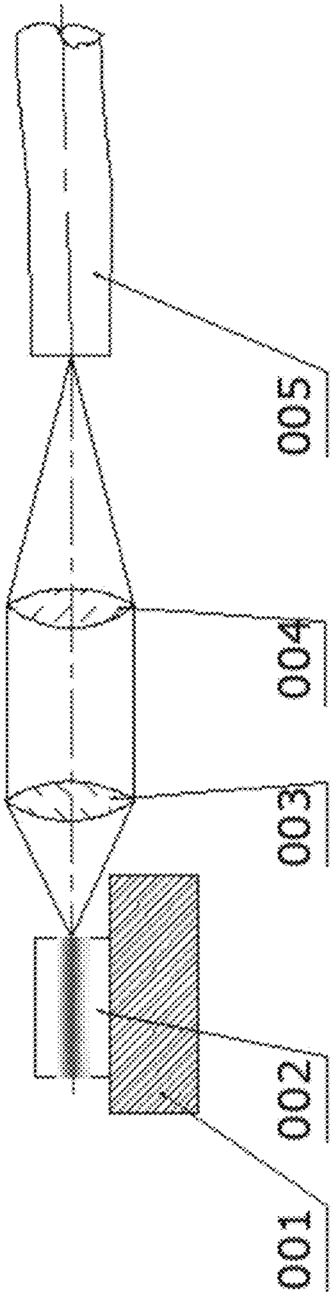
FIG. 2 illustrates an exemplary chip-to-fiber coupling by a two-lens packaging system, in accordance with an embodiment of the present disclosure.

On the other hand, while the far field beam divergence is up to 30 degrees or more, the far field angle of a single mode fiber is about 14 degrees for a NA of 0.122. Due to mismatch between the optical fields of a butt ended standard fiber and the edge-emitting laser chip, the coupling efficiency of simple single mode butt fiber to edge-emitting laser chip can be as low as 10% or lower. To gain a better coupling performance, an optical system is needed for the optical mode field transformation. From the perspective of geometric optics as shown in FIG. 2, this optical system is designed to collect the light emitted from the active layer of the laser chip and image it into fiber end for coupling. A simple two ball-lens system was first utilized to adapt the two mode fields, and the coupling efficiencies can be up to 30%. Also, the approaches of using graded index lenses or selfoc-lenses were also investigated.

Figure 3A:
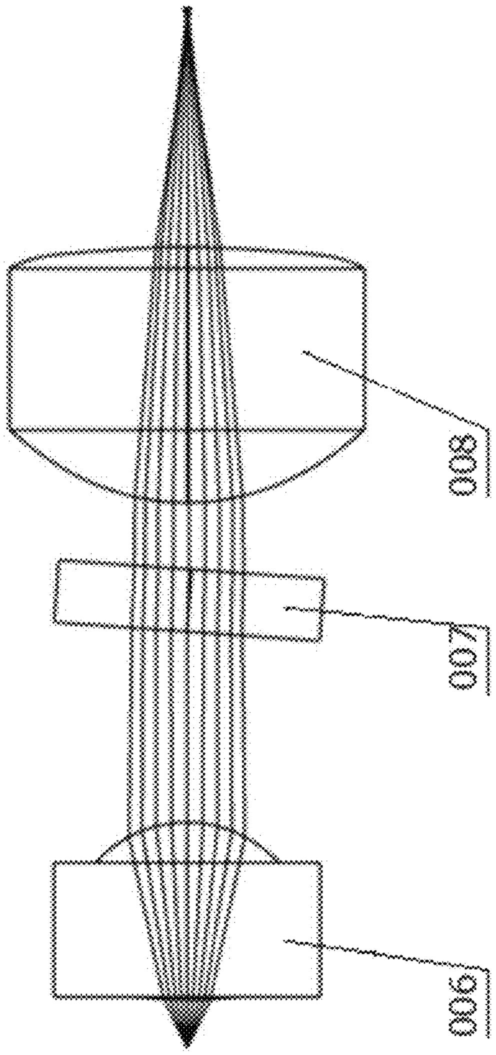
Figure 3B:
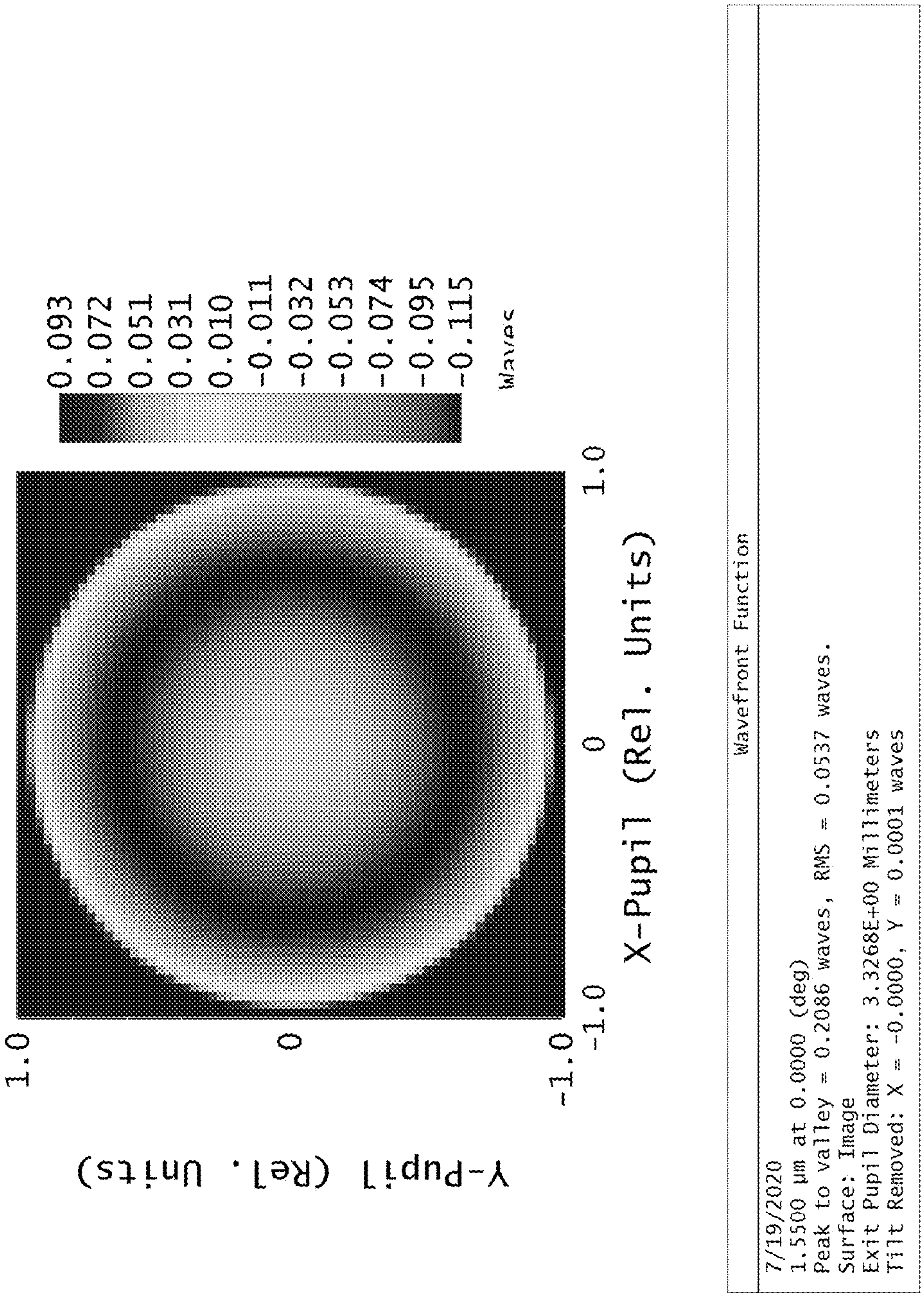
Figure 3C:
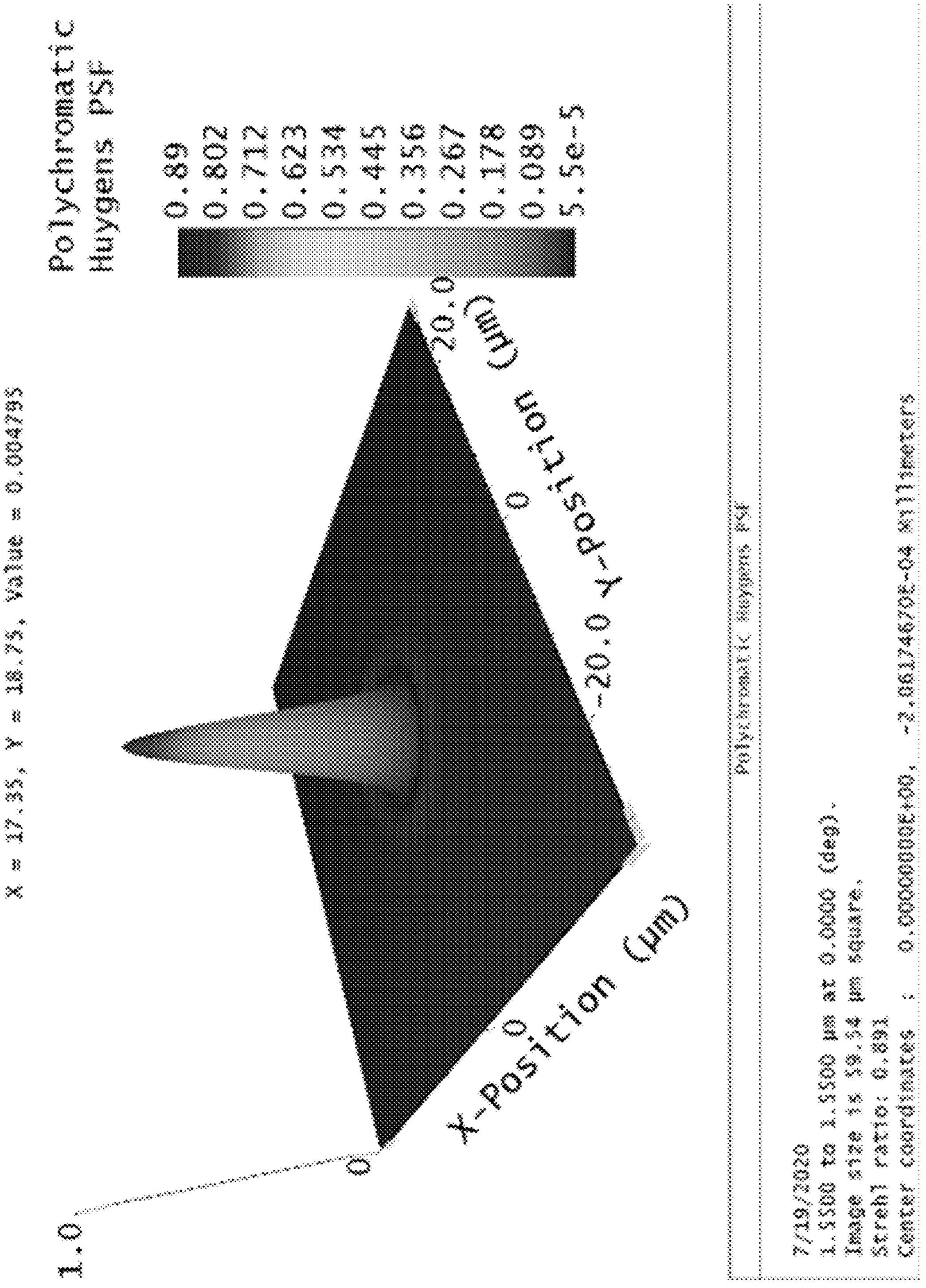
Figure 3D:
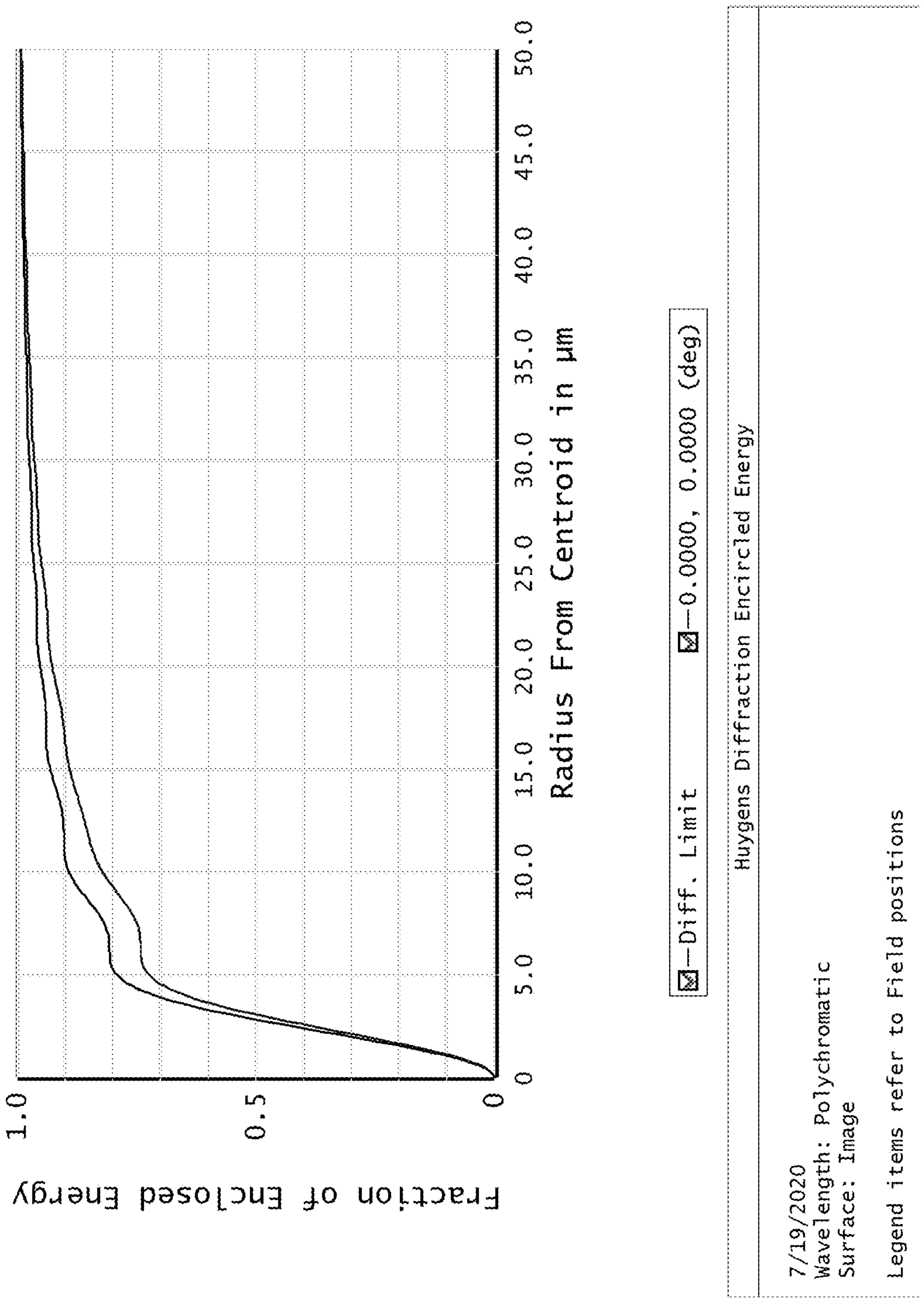

FIG. 3A shows an example of a mature packaging technology presently on the market. It utilizes a micro-lens (006) with a large numerical aperture (NA) to collimate the light emitted from the laser chip (002) and use another micro-lens (008) to refocus the beam into the fiber end (005) for fiber coupling. The collimation lens (006) is designed as an aspherical lens to eliminate the spherical aberration, and a sapphire anti-reflection coated window (007) is employed for sealing the hermetic TO-can. The optical quality of the whole optical packaging system is generally excellent, and for this example shown in FIGS. 3A-3D, it is diffraction-limited at the wavelength of 1550 nm. With the optical packaging technologies available, the fiber coupling efficiency has been promoted to 70% or more. To well align the optical packaging system in relative to the chip (002) and the fiber (005), high precision optical alignment is required. Several actuator-driven precision kinematic systems that offer six degrees of freedom active alignment for each of the OSA element adjustment have been developed and commercially available with translation resolution of better than 0.02 μm and angular resolution of better than 1" arc second.

The laser beam as presented for coupling has wave front phase errors from the LD and optical aberrations from optical packaging module and optical alignment. In order to ensure maximum coupling efficiency, beam quality at or close to the diffraction limit is generally required. With the implementation of automatic active aligning system for the chip-to-fiber alignment, the OSA system can be positioned in XYZ directions with sub-micron accuracy and fixed in place by laser welding, which indicates that the wave front aberrations due to optical misalignment of OSA system is negligible and can be ignored. Given that the delicate optical packaging modules generally are (or closely) diffraction-limited, thus the inherent wave front phase error from laser diode is believed to be the main cause for the degradation of the laser-fiber coupling performance in the fiber optic transceivers.

For high-performance laser chips, such as DFB and EML lasers, manufacturers have experienced low LD productivity as well as low laser chip-fiber coupling efficiency in optical packaging, and thereby low yields of optical transceiver modules. Laser chip-fiber coupling efficiency has generally been limited to about 70%, but more commonly the laser chip-fiber coupling efficiency tends to be in the range of about 30% to 60%. The low coupling efficiency has put more optical transceivers out of specification. If the coupling efficiency is increased, more low-power LDs will become in spec thereby alleviating heating issues in optic transceivers, because the low-power LDs generate less heat.

Laser chip-fiber coupling efficiency is believed to be more directly determined by wave front phase error of laser diode. However, at present, wave front phase is not a specification for charactering LD chips or OSA products in production of semiconductor laser and fiber optics industry. That is, present quality specifications for laser diode chips used, including electrical and optical, are not known to include specifications for wave front phase. The widely used specifications include operating current, threshold current, slope efficiency, forward voltage, LD reverse voltage, dark current, wavelength, spectral width, continuous wave (CW) output power, resonance frequency, side mode suppression ratio (SMSR), near field, far-field divergence angles, operating temperature and lifetime, etc. Table 1 shows a list of characteristics of a 1550 DFB diode laser purchased from market, which apparently does not include wave front phase parameters.

TABLE 1

Specifications table of a commercial 1550 nm DFB laser diode (LDI-1550-DFB-2.5G-20/70)
ELECTRICAL-OPTICAL CHARACTERISTICS
(TYPICAL @ T = 25° C.

| | | |
|---|---|---|
| Wavelength | 1550 | nm |
| CW, P | 20 | mW |
| Spectral Width | 0.09 | nm |
| Spectral Width | <500 | kHz |
| Wavelength-Temperature Coefficient | 0.1 | nm/° C. |
| Side-Mode Suppression Ratio | 40 | dB |
| Threshold Current | 8 | mA |
| Operating Current (CW 20 mW) | 105 | mA |
| Operating Current (Pulse, P = 70 mW) | 450 | mA |
| Operating Voltage | 1.3 | Volts |
| Slope Efficiency | 0.23 | mW/mA |
| Pulsed Rise, Fall Times (20-80%) | 80 | ps (pachage type dependent) |
| Resonance Frequency | 6 | GHz |
| Monitoring Output Current | 1.5 | mA |
| Dark Current | <100 | nA |

The intensity distribution of an ideal laser beam is Gaussian. At present, the dominant laser beam characterization method is to measure the second order moments of the Wigner density function to form a 4×4 beam matrix. The Wigner distribution function represents a signal in the space and frequency domains simultaneously. The zeroth-order moment describes the total power, the first-order moments provide the centroid and propagation direction, the second-order moments are related to the beam width and far-field divergence angles, and the third- and fourth-order moments are linked to the beam symmetry and sharpness of a laser beam. The ISO standard 11146 provides a general procedure for characterizing the propagation properties of an arbitrary beam by measuring beam irradiance with a CCD-camera in a single transverse plane.

M-square ($M^2$), or laser beam quality factor, is calculated by evaluating the second moment width of the real beam intensity profile transverse to beam propagation direction. M-square has been widely used as a metric for characterizing laser beam quality. It defines how many times of "diffraction limited beam size" a real beam is in the transverse direction, which represents the degree of variation of the real beam from an ideal Gaussian beam. For a single mode TEM00 Gaussian beam, its M-Square is exactly one. However, the M-square is not a precise characterization of beam quality. It is generally true for a beam with small wave front error (less than ~0.1λ RMS) that M-square parameter and wave front phase error are comparable. When wave front phase error increases, the M-Square parameter increases dramatically nonlinearly (>>1) and is less predictable, because the impacts of different wave front aberrations on M-Square are dramatically different. Furthermore, real laser beams are usually non-Gaussian, multi-mode or mixed-mode. There are many cases in which a beam looks very Gaussian yet its M-square value is far from unity; likewise, a beam intensity profile appears very "un-Gaussian" yet its M-square value is still close to unity. Generally, M-square increases as a laser's output power increases, so it is difficult to obtain excellent beam quality and high average power at the same time due to thermal lensing in the laser gain medium. In many cases, the formulae for calculating the beam matrix do not apply, and M-Square becomes a more qualitative other than a quantitative measure of beam quality. Many authors have provided methods to evaluate the beam quality factor from wave front phase error, but it is almost impossible to obtain the wave front phase information from an M-Square value. However, it is the wave front phase information rather than the intensity profile that is believed to be the dominant influence on beam propagation. Thus, to more precisely characterize the beam quality of a LD product, the laser wave front phase should be measured. However, so far, wave front phase measurement of laser diode is not widely implemented for quality inspection. A deeper reason behind is that how to define the phase of an incoherent or multimode beam is still not well understood.

Several wave front sensors are available that can be used for infrared wave front phase measurement. As a candidate for laser diode specification, wave front phase measurement should be implementable, accurate, repeatable and efficient.

Foucault knife-edge testing involves moving a knife-edge through the focus of a beam and observing the intensity pattern on a screen. Like interferometry, knife-edge testing allows high-spatial frequency aberrations to be observed, but it requires very accurate alignment of the knife-edge to the beam focus, and it is a qualitative visional test.

Curvature sensing is a technique used typically in adaptive optics to measure the Laplacian of the wave front by measuring the normalized differential intensity change along the optical axis, but it has not been widely made commercially available.

While ptychography allows reconstructing both the intensity profile and wave front phase of laser beam for complete beam matrix and derived quantities such as M-Square and wave front phase. However, its computational complexity is heavy and its efficiency is an issue because it requires a 2D sample scanning.

Interferometry is a technique to make the wave front interfere with itself or an ideal wave front. It is good for measuring aberrations of high spatial frequency and low amplitude aberrations but can be degraded by air motion and mechanical vibrations, especially for testing large optics. Its instrument volume is usually large and its optical layout is complicated. Sophisticated software is necessary for extracting meaningful and accurate information from interferograms. Commercial interferometers are typically very costly.

The Shack-Hartmann sensor is deemed herein as the most convenient wave front sensor for diode laser beam characterization. The Shack-Hartmann sensor measures the wave front phase by measuring wave front gradients in real time. It is independent of higher-order aberrations and intensity profile variation, and it has good photon efficiency over the anticipated wavelength bands. The commercial instrument usually provides software for real time image analysis and product characterization, which is ideal for production online testing. Unlike the Wigner density function approach, the Shack-Hartmann wave front sensor does not need a priori knowledge about the beam before the measurement is conducted.

Due to its large numerical aperture (NA) and nonsymmetrical radiation profiles of the diode laser in the two perpendicular directions, it is much more difficult to measure the wave front phase profiles than the intensity profiles. LD output beams tend to exhibit a very large diverging field due to the diffraction at the end facet of the laser cavity, which is inversely proportional to the emission aperture size, but the aperture size of OSA in optical packaging is very small, usually less than 1 mm (~0.7 mm), with a about 0.2 mm working distance, which makes direct wave front phase measurement of laser diodes with the OSA attached very difficult. The wave front phase of a laser diode may be measured at the focus point of OSA system, and the metrology system needed has small NA, as small as 0.1, which is easy to achieve, but the wave front phase error measured in this way has the residual aberrations from the OSA system and the entire OSA packaging system must be discarded even if only the LD is out of spec.

For highly divergent wave fronts, the wave front phase measurement is also sensitive to the input NA and the location of the entrance pupil of the metrology system. To obtain the true wave front phase of laser diode, the location of entrance pupil and the size of input NA matter. In addition, the laser diode is a non-Lambertian source, and its emitting power is relatively low (generally a few 100s of mW). The volume intensity distribution profile of laser diode is inhomogeneous and not radially symmetrical, and it varies from chip to chip, which makes the irradiance-based wave front phase measurement very challenging.

As described below, an infrared Shack-Hartmann sensor may be used to measure the wave front aberrations of diode laser Chip on Carrier (CoC), providing an in-situ wave front phase measurement for the laser chips, yielding a new metric for characterizing the optical performance of laser diodes.

In this disclosure, the following philosophy of metrology system design is presented: The way a diode laser beam is measured should be the same as or similar to the way the diode laser beam is intended to be used and functioning in the OSA packaging system. The metrology system design should imitate the OSA packaging system design to ensure that the laser diode is measured under the conditions similar to that of its expected use.

With the proposed method implemented in production, the wave front phase parameters measured can be used to reject the out-of-spec chips before incorporating the chips in optical module packaging, which provides a new approach to screen out the out-of-spec laser diodes for BOSA/TOSA production. The metric used for screening laser chips can be the wave front phase error or aberrations from measurements or a new metric that is computed from the wave front phase aberrations and other parameters of optical property of laser diode. The optical property of diode laser chips can be inspected as early as possible in production to avoid the costs of assembling and scrapping out-of-spec OSA packaging systems.

To imitate the OSA packaging system, a large NA lens can be used to collimate the laser beam from a laser diode and a focusing lens can be used to focus the collimated beam into a focused point: The first two lenses can form a replica of OSA packaging system used in optical transceivers. The focused beam becomes divergent after the focused point and it can then be re-collimated to a desired size in advance of the wave front sensor. By dedicated optical design, the exit pupil of the metrology system can be matched to the detector of wave front sensor, and the detector is conjugated to the entrance pupil of the metrology system. With this arrangement, the true value of wave front phase of laser diode that is intended to be used in optical transceiver can be obtained, yielding an optical specification for laser diode, OSA system and optical module characterization.

This disclosure also describes direct wave front phase measurement of Optical Sub-Assembly (OSA) devices, which provides an improved specification for characterizing OSA quality and optical transceiver performance. In order to increase the laser-fiber optic coupling efficiency of optical transceiver, the mode match between laser beam and fiber end should be optimized to reduce the energy loss in optical packaging. The laser beam from the OSA devices to the fiber has wave front errors from both the optical packaging system and the laser diode. It is a prerequisite for mode matching that the wave front error from the laser diode and the optical packaging system should be at a possible minimum level. With the infrared wave front phase analyzer, we can examine the true value of wave front phase from laser diode and separate it from the wave front phase errors measured from OSA, yielding a quality diagnosis for OSA system.

Before explaining the disclosed embodiments of the present disclosure in detail, it is to be understood that the disclosure is not limited in its application to the details of the particular arrangements shown since the disclosure is capable of other embodiments. Also, the terminology used herein is for the purpose of description and not of limitation.

Working Wavelength

Earlier optical links were designed for the 800-900 nm window of the optical fiber transmission spectrum, consistent for the wavelength of AlGaAs material system for semiconductor lasers and LEDs. The development of diode lasers and detectors in the 1.3-1.5 μm wavelength range and the further improvement in optical fiber loss over that range has directed most applications to either the 1.3 μm window for low dispersion or the 1.55 μm window for minimum loss. The design of dispersion-shifted single mode fiber along with the availability of erbium doped fiber amplifiers (EDFA) has solidified the 1.55 μm window as the choice for high-speed communications. Also, the 1.55 μm laser diodes are classified as "retina-safe' for human and 1550 nm is the ideal wavelength of choice for LiDAR applications due to its eye safe nature at high power. For these reasons, the laser diodes that have 1550 nm wavelengths (including 1550 nm DFB and 1577 nm EML) are becoming more widely used in consumer and industrial applications.

In this disclosure, we feature a 1550 nm LD as the semiconductor light source to demonstrate an intended implementation, but the implementation description is also applicable to other light sources.

The considered laser diode source is monochromatic light source whose emitting wavelength is in near infrared band. For example, for industrial DWDM (Ch13-Ch61), its wavelength range is of 1528-1568 nm. TEML and DWDM EML are products with multiple working wavelengths. Semiconductor Optical Amplifier (SOA) assisted EML is with wavelengths of 1532 nm, 1577 mm and 1596 nm. In order to accommodate for more laser diode products, the metrology system is designed with a working wavelength range of 1528 nm-1577 nm, whereas the central working wavelength is set as 1552 nm (193.1 THz).

Optical Design

An objective for at least some of the embodiments envisioned herein is to provide direct and absolute measurement of wave front phase of a diode laser. According to Imagine Optic, the absolute measurement is aspirationally defined as "the ability to provide the most accurate, quantitative and objective data possible on the optical qualities of a light source without relying on a similar external reference in order to establish a proportional relationship." If the wave front phase measurement is not of the true value of a laser diode, then it will not be much use for optical transceivers production. In order to create a quality specification for laser diodes or LED's, it is beneficial to have absolute phase measurement of the laser beam. However, as we described in the previous section, to achieve absolute measurement over a wide dynamic range is a challenge, because Shack-Hartmann sensor is irradiance-dependent wave front sensor while the diode laser beam intensity is inhomogeneous and there is significant intensity variation over the pupil.

Figure 4:
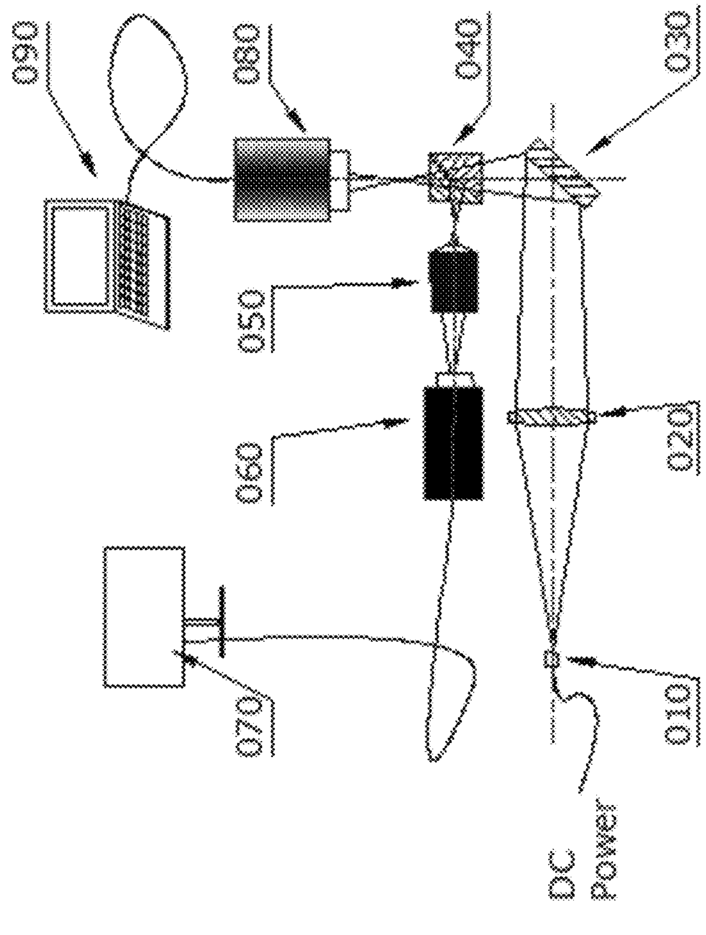
FIG. 4 illustrates an exemplary system to directly measure both wave front phase and PSF, in accordance with an embodiment of the present disclosure.

To minimize inhomogeneous beam intensity to obtain a nearly perfect spherical wave front, a single mode fiber coupled to a laser diode or a laser diode put in distance can be utilized as a light source in a metrology system as shown in FIG. 4. However, the scenario that the measured beam is convergent or divergent to the sensor should generally be avoided, because of systematic errors that could prevent the envisioned sensor from measuring the true wave front values.

Figure 10:
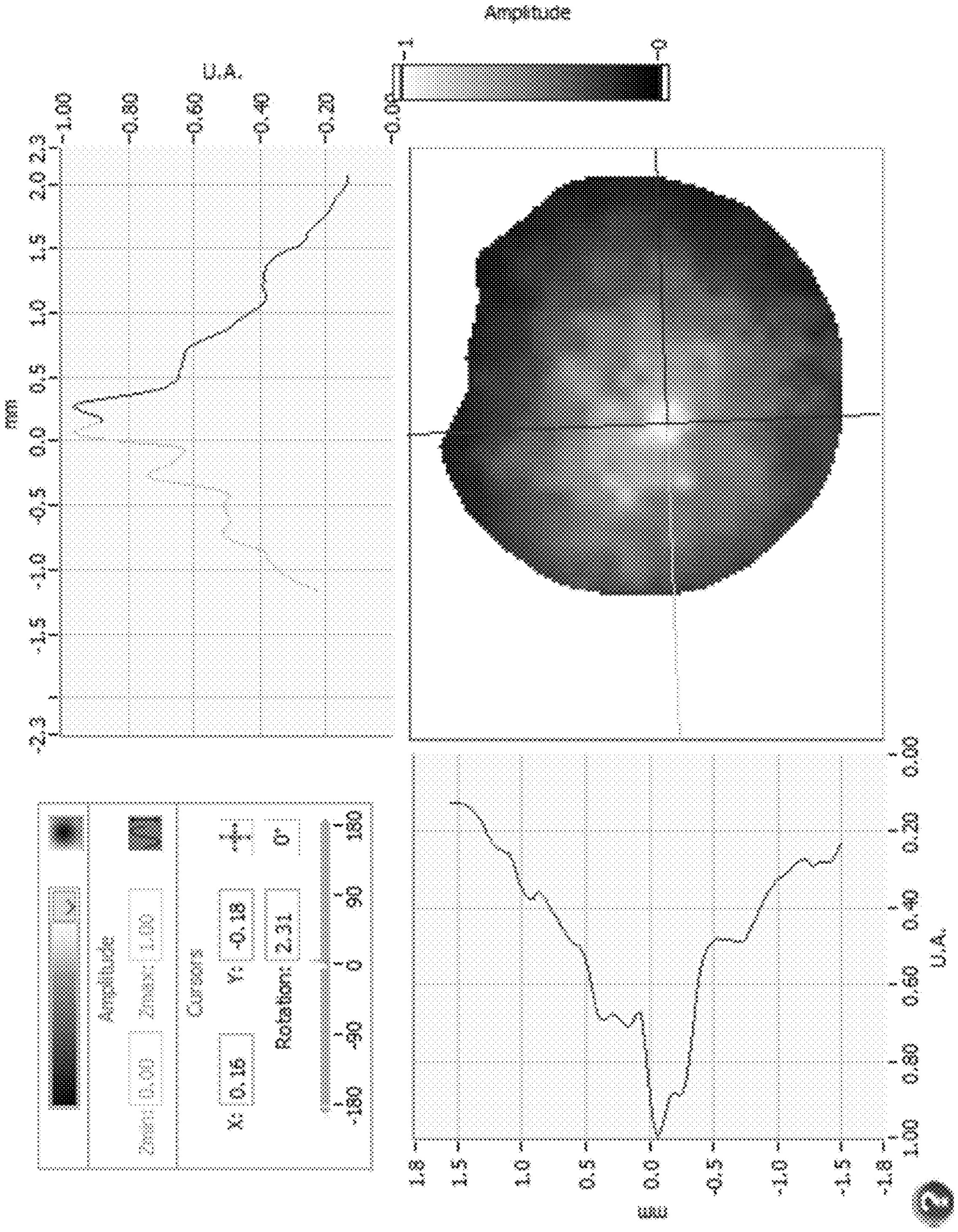
FIG. 10 illustrates an exemplary beam intensity measured at a wave front phase testing pupil, in accordance with an embodiment of the present disclosure.
Figure 11:
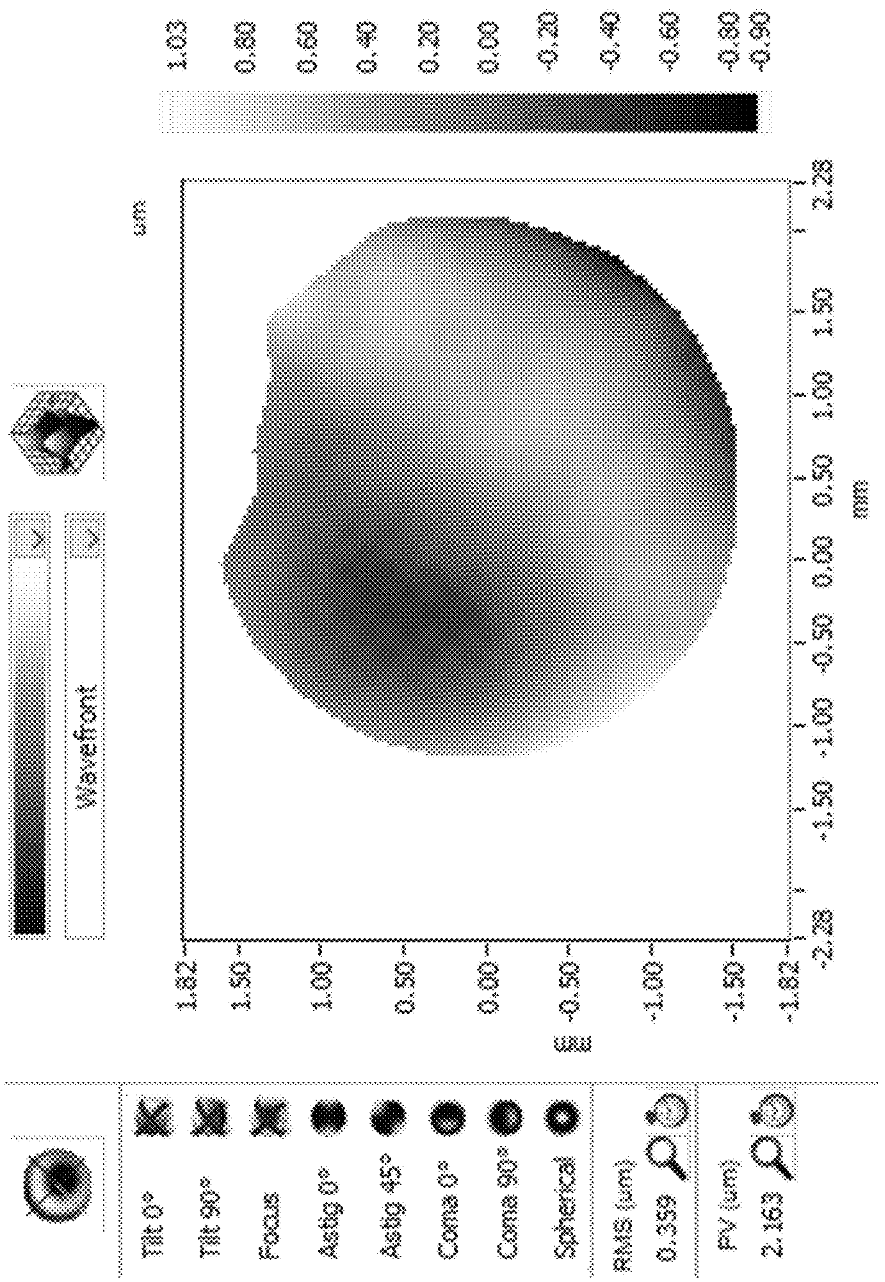
FIG. 11 illustrates an exemplary beam wave front phase measured at a testing pupil, in accordance with an embodiment of the present disclosure.

In view of the asymmetry and inhomogeneity of the emitting beam profile of laser diode, as shown in FIG. 10 and FIG. 11 in next section, the optical testing pupil at which wave front phase is measured is irregular. Special boundary treatment is required in wave front phase estimation algorithm, which introduces more complexity of the problem.

Also, the laser diode emitting beam is highly divergent, so the wave front phase measurement of laser diode is metrology NA dependent. The wave front phases measured at different NAs within the diode laser emitting profile are different.

In this disclosure, the following philosophy of metrology system design is presented: In order to measure the true wave front phase associated with an intended use of laser diode, the optical design of the metrology system should imitate the OSA packaging system design in which the laser diode is intended to be integrated and normally functioning. More reliable results are expected from metrology system designs those better approximate relevant details of the OSA packaging system design.

To implement this philosophy, the divergent beam wave front of diode laser is preferably substantially captured by an aspheric lens with the same NA as the collimation lens used in the OSA packaging system so as to capture the same portion of emitting light from the laser diode as it is normally collimated in the OSA system into a parallel beam, and a focusing lens can be used to re-focus the parallel beam into a focused point, which can be characterized as the Point Spread Function (PSF) in Fourier domain. Another collimation lens can be used to re-collimate the beam from the focused point to match the size of the detector of wave front sensor while still satisfying the metrology system pupil conjugation requirement. The collimating and focusing functions could also be performed by other known types of optics providing the desired optical powers.

The output beam of a laser diode is highly divergent. Given that the divergent angle of the diode laser beam is generally more than 22 degrees for most cases, therefore a collimation lens designed for collecting the divergent beam from laser diode preferably has a numerical aperture (NA) larger than 22 degrees. According to the NA size of the collecting system, the optical design for laser diode metrology can be classified into three configurations as described below:

Config A: Small NA Metrology System

Figure 5A:
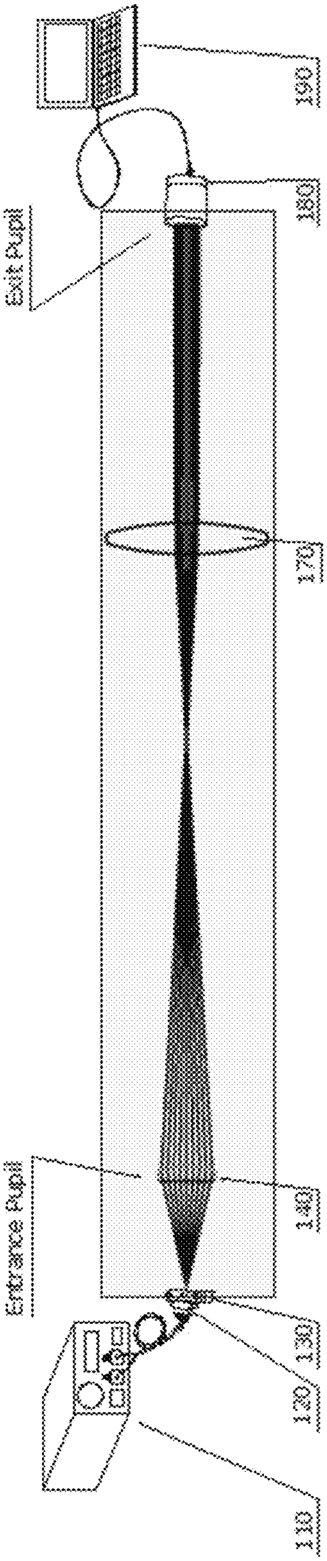
Figure 5B:
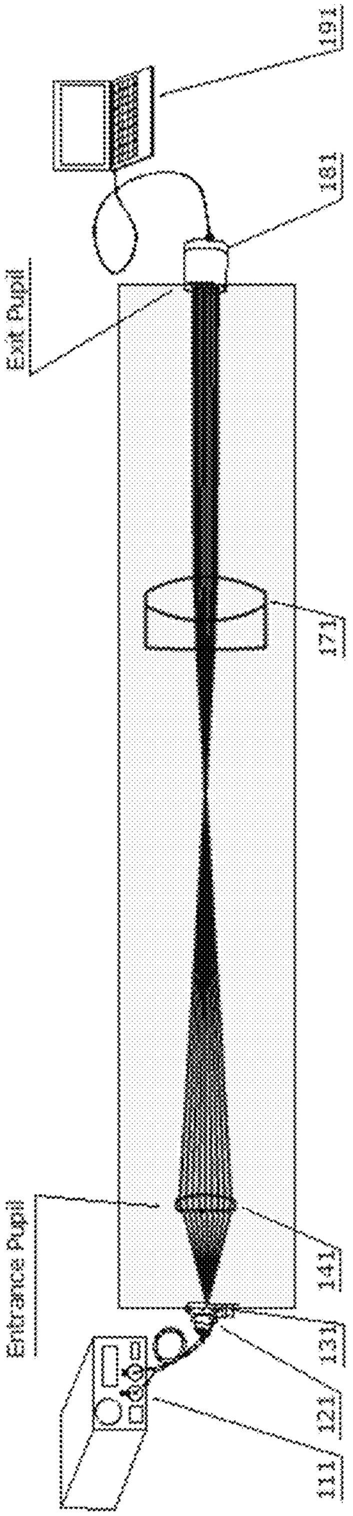
Figure 5C:
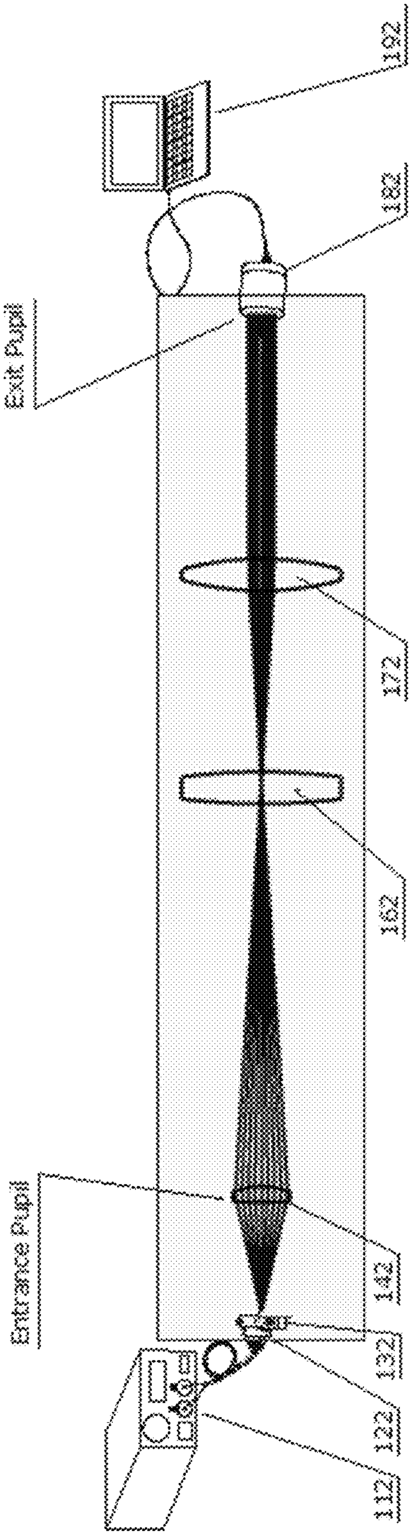

As shown in configuration A of FIGS. 5A-5C, when the NA is small, the first collimation lens and the focusing lens are so close in position that they can be combined into one collecting lens (130, 141 or 142) while the optical quality of metrology system is still very good. In that case, the metrology system can be a two-lens system. The first lens is a collecting lens A (140, 141, 142) with NA larger than 22 degree that is used to substantially capture the divergent beam emitting from laser diode and image it into a point image, and the second lens is collimation lens C, which could be a singlet (170, 171) or doublet lens (172), that is used to collimate the laser beam to match the detector size of the wave front sensor while also satisfying the pupil and detector conjugation requirement. A field lens D (162) can be added to improve the imaging quality and radiometry performance. Examples of this two-lens system are shown as Examples A and B in FIGS. 5A-5B, respectively, and an example of three-lens system is shown as Example C in FIG. 5C. For Example A, Lens A (140) is an aspherical lens with focal length of 11 mm, and Lens C (170) is a spherical singlet with focal length of 25 mm, offering an objective NA of about 0.22 (25 degree) and a very good imaging quality. A singlet is used in Example C as field Lens D (162). While the exit pupil is at the location of the detector of wave front sensor, the entrance pupil is set as physical aperture of Lens A. The merit of this system is its compactness: The optical length is short and simple, but the objective aperture (NA) offered is relatively small.

Config B: Intermediate NA System

Figure 6A:
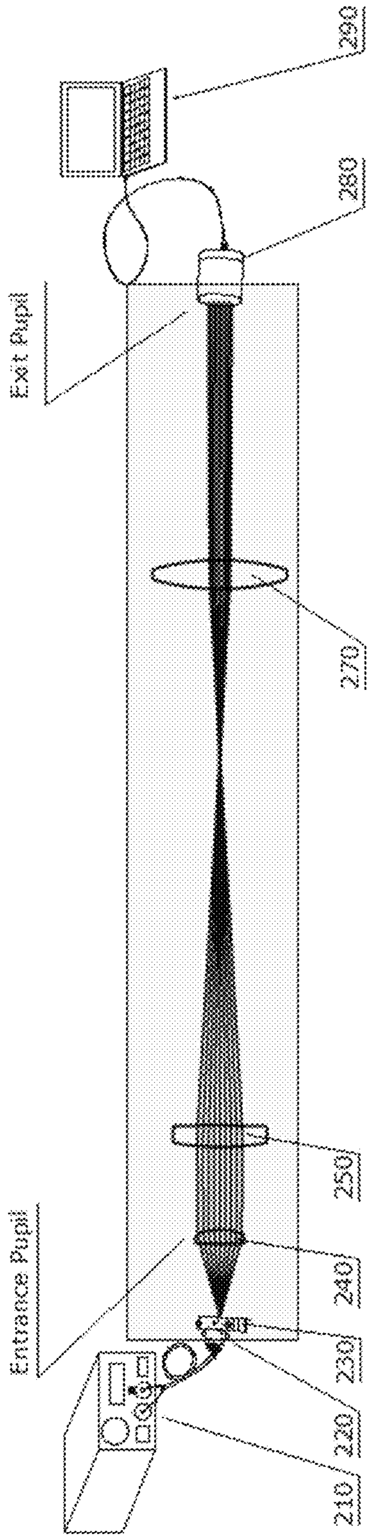
Figure 6B:
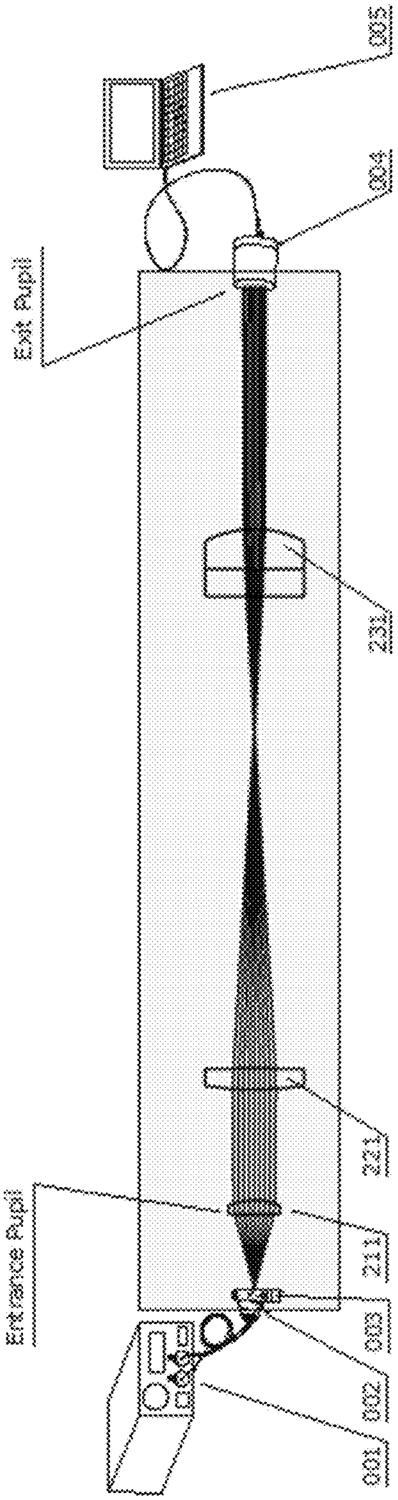
Figure 6C:
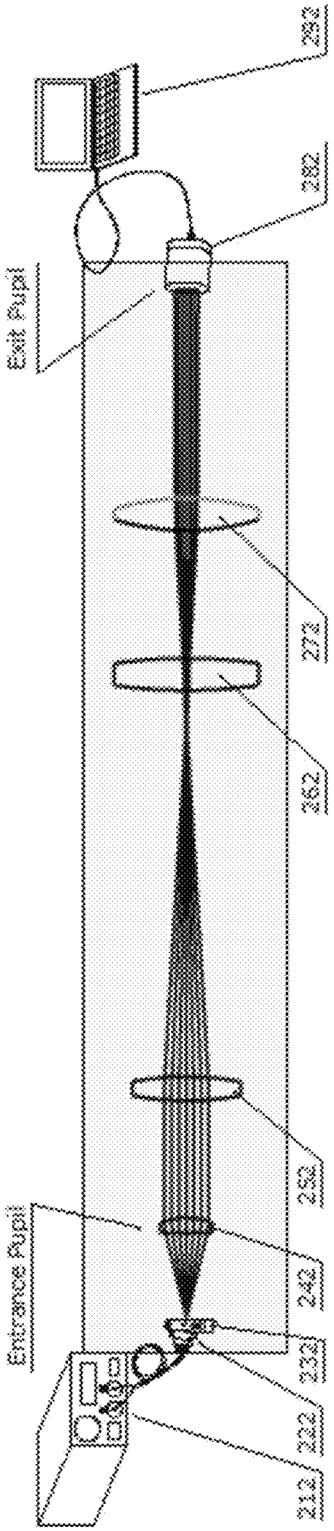

For a metrology system with intermediate NA, a three-lens system can be employed as shown in FIGS. 6A-6C. Config B design imitates the most commonly used OSA packaging system. The First lens A (240, 241 or 242) is used to collimate the divergent beam from laser diode and make it parallel, focusing Lens B (250, 251 or 252) then focuses the parallel beam to a point, and the collimation Lens C (270, 271 or 272) re-collimates the divergent laser beam from the focused point to match the detector size of wave front sensor (280, 281 or 282), while also satisfying the pupil conjugation requirement. The way the laser diode in Config B is being tested for wave front phase measurement is a mimic of the way it is being used in an OSA packaging system. As shown in FIG. 6A, Example A, a system with f=11 mm aspherical collimation lens A (240) plus an f=45 mm lens B (250) and a f=25 mm lens C (270) offers NA of 0.23-0.29, which equates NA incident angle of 27-33 degree. The first two lenses in FIG. 6A form a replica or a mimic of the OSA system as presented above with respect to FIGS. 2 and 3A. As shown in FIG. 6B Example B, the collimation Lens C (271) can be designed as a doublet instead of a singlet lens, and a field lens (262) can also be added to guarantee the pupil conjugation and high image quality as shown in FIG. 6C Example C. While the exit pupil is at the location of the detector of wave front sensor, the entrance pupil is set as the physical aperture of First Lens A in general.

Config C: Large NA System

Figure 7A:
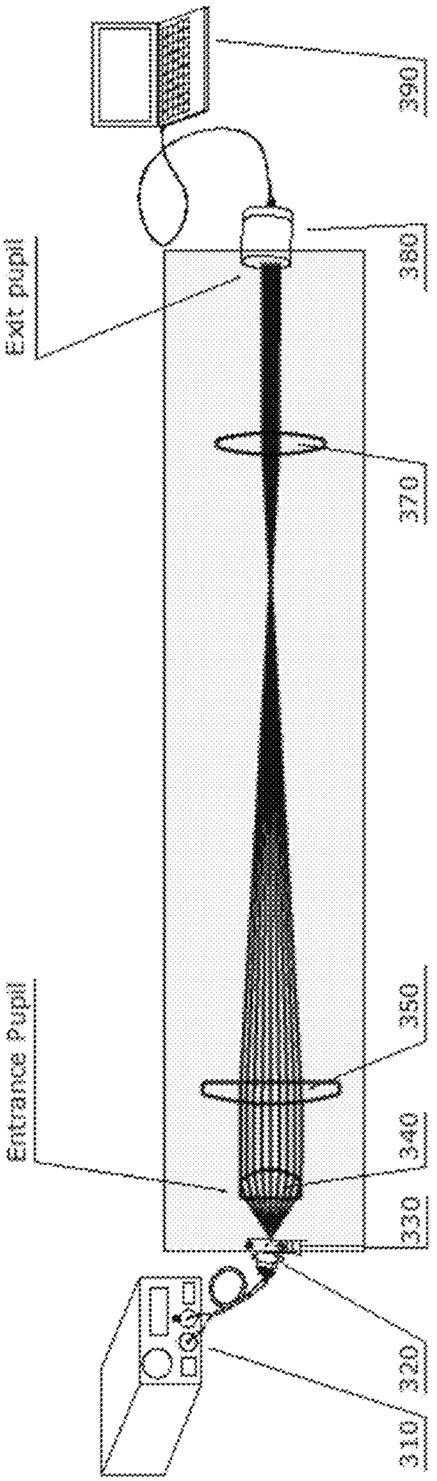
Figure 7B:
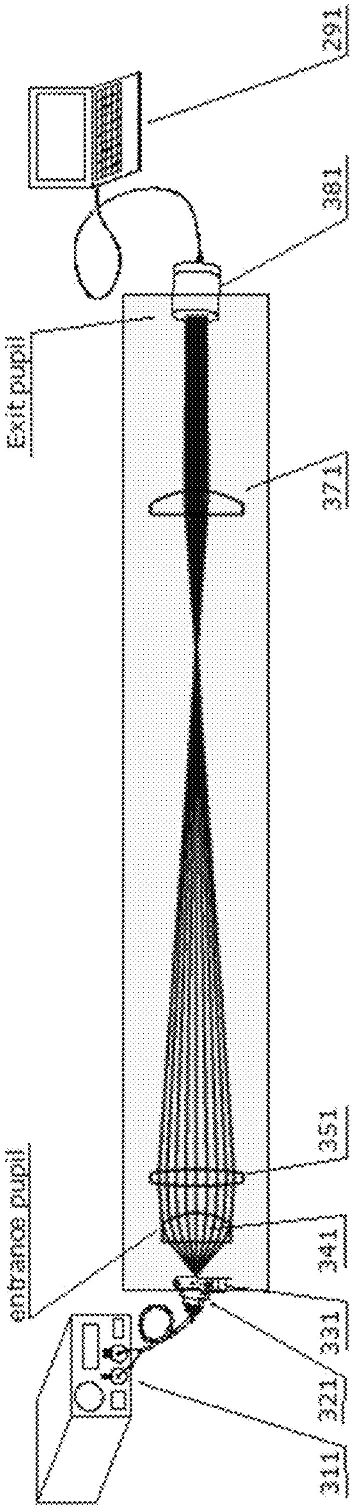

For the laser diode with large NA emitting beam, the metrology system design is more challenging. A large NA aspherical single lens can be used to collect the emitting beam from the laser diode and make it parallel, and a focusing lens plus a collimation lens can be employed to reduce the laser beam to match the detector size of wave front sensor, while still satisfying the pupil conjugation with wave front error minimized. FIGS. 7A-7B illustrate a metrology system for large NA diode laser. A system with f=10 mm aspherical collimation Lens A (340) offers NA of 0.53-0.58, which is equivalent to incident angle of 65-71 degrees. A plano-convex spherical lens (350) plus a bi-convex lens (370) (as shown in FIG. 7A Example A) or a bi-convex lens (351) plus a plano-convex spherical lens (371) (as shown in FIG. 7B Example B) can be used for image relation and pupil conjugation. While generally the exit pupil is at the location of the detector of wave front sensor, the entrance pupil is set as the physical aperture of First Lens A. Both examples can yield excellent image quality.

The major wave front aberrations of laser diodes that affect the performance of laser-to-fiber coupling performance include spherical aberration, astigmatism, and coma. The most well-known wave front aberration of laser diodes is astigmatism. In order to obtain the maximum laser-fiber coupling efficiency, the wave front phase error of laser diode should be minimal, and the optical quality of the metrology system should be at or close to the diffraction limit. In other words, Rayleigh criterion should be satisfied or approximately satisfied.

As a metrology system, it should be calibrated periodically. As shown in the prototype system in the next section, there is a residual systematic error in the optical design. Also, there are manufacturing errors and optical design tolerance error in the system. We can periodically calibrate the system either with a golden standard sample of laser diode or with small pin hole illuminated by the infrared light source to replace standard laser diode sample. Based on the calibration measurements, a reference file can be generated and saved for implementation in real data measurement.

Prototype System of Wavefront Phase Analyzer for Laser Diode Chip Inspection

In the following example, a HASO4 NIR sensor by Imagine Optics SA of Orsay, France is used for purposes of prototyping. HASO4 NIR is a technology that can get wave front local slope cartography in the infrared band of 1500-1600 nm. It is bundled with WaveView metrology software, yielding wave front parameters, such as PSF, Strehl ratio, MTF and $M^2$.

Figure 8:
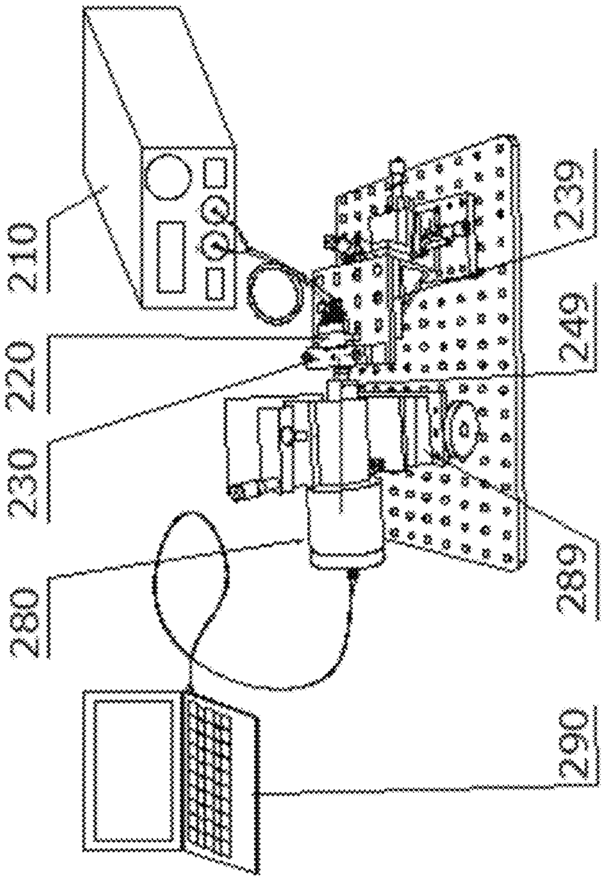
FIG. 8 illustrates an exemplary prototype system for a wave front phase metrology of a laser chip, in accordance with an embodiment of the present disclosure.

In this section, a prototype metrology system for intermediate NA (FIG. 6A) is described. Given that the far field beam divergence laser diode is typically less than 30 degrees, a collimation Lens A (240), with focal length of 11 mm plus a focusing Lens B and collimation Lens C can provide a metrology system with intermediate NA of 0.284 (far field angle 33 degree), which could accommodate most laser diode products on market. Lens A (240) is a plano convex lens with an aspherical surface for correcting the spherical aberrations. Lens B (250) has a focal length of 45 mm, and Lens C (270) has a focal length of 25 mm. The characteristics parameters of the prototype system are listed in Table 2, and its experimental system is shown in FIG. 8.

TABLE 2

Characteristics of prototype metrology system

| | |
|---|---|
| Entrance Pupil | 6.68 mm |
| Objective NA | 0.284 (32.97 deg) |
| Wave front RMS error | 0.2567 μm |
| Wave front PV error | 0.891 μm |
| Total length | 140 mm |
| Effective Focal Length | EDL = −6.0 mm |
| Back Focal Length | 38.85 mm |
| Image Space F/# | 0.9 |
| Paraxial Working F/# | 74.34526 |
| Working F/# | 84.534 |
| Image Space NA | 0.006714 |
| Object Space NA | 0.2838 |
| Stop Radius | 3.34 mm |
| Paraxial Image Height | 0.433 mm |
| Paraxial Magnification | 44 |
| Entrance Pupil Diameter | 6.68 mm |
| Entrance Pupil Position | 1.097 mm |
| Exit Pupil Diameter | 3.60 mm |
| Exit Pupil Position | 0 mm |

TABLE 2-continued

| Characteristics of prototype metrology system | |
|---|---|
| Field Type | Angle in degrees |
| Maximum Radial Field | 0.05 |
| Primary Wavelength [μm] | 1.55252 μm |
| Angular Magnification | −1.855 |

Results of Laser Diode Chip Inspection

Figure 9:
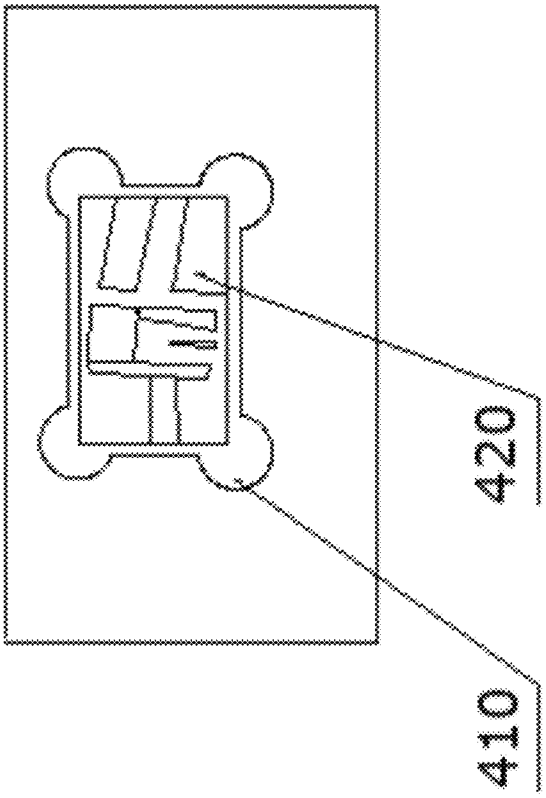
FIG. 9 illustrates an exemplary 1577 EML laser diode chip on Cartridge slot for testing, in accordance with an embodiment of the present disclosure.
Figure 12:
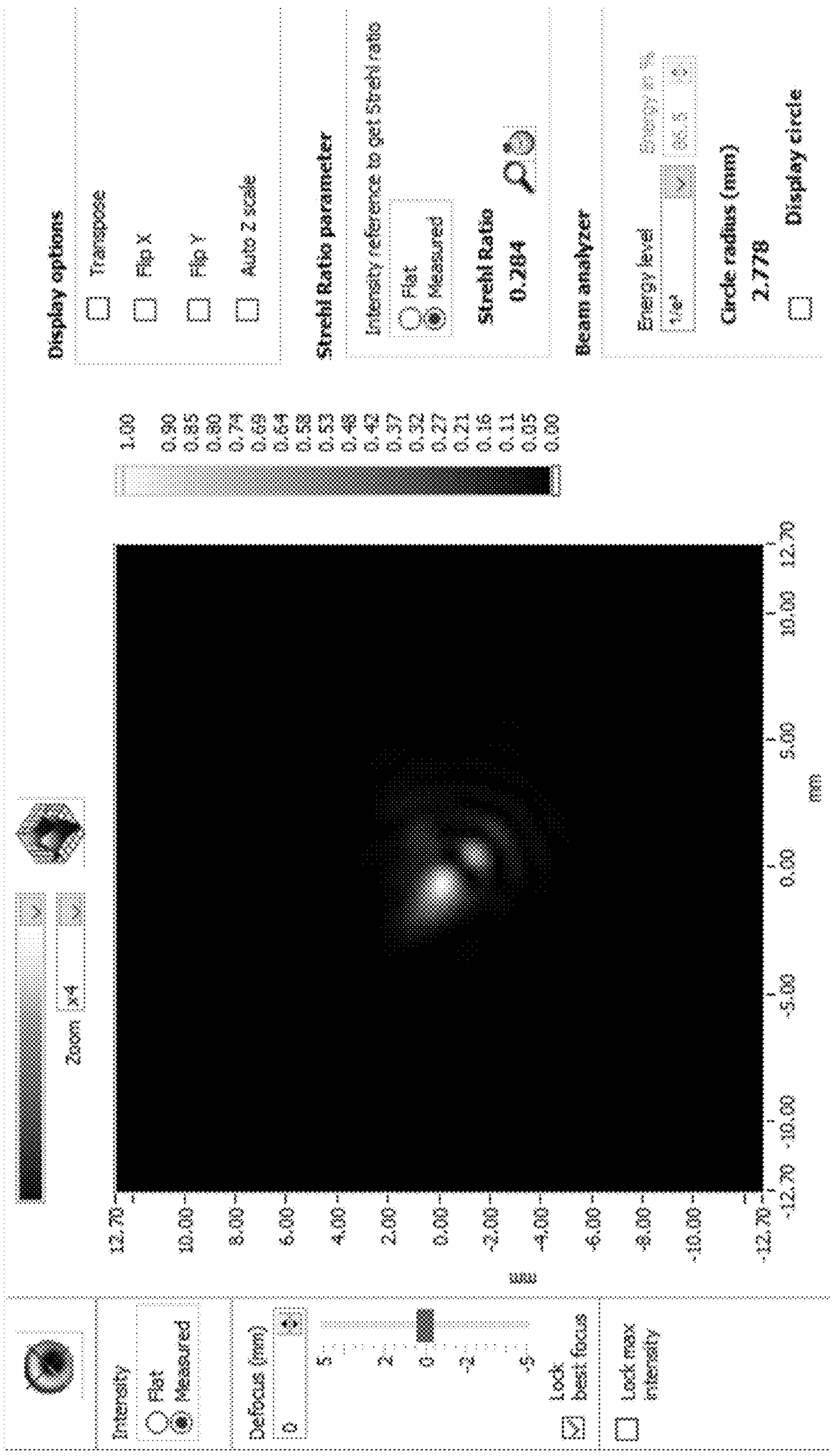
FIG. 12 illustrates an exemplary point spread function computed from a measured beam wave front phase, which is an intensity distribution at a laser-fiber coupling focus point, in accordance with an embodiment of the present disclosure.
Figure 13:
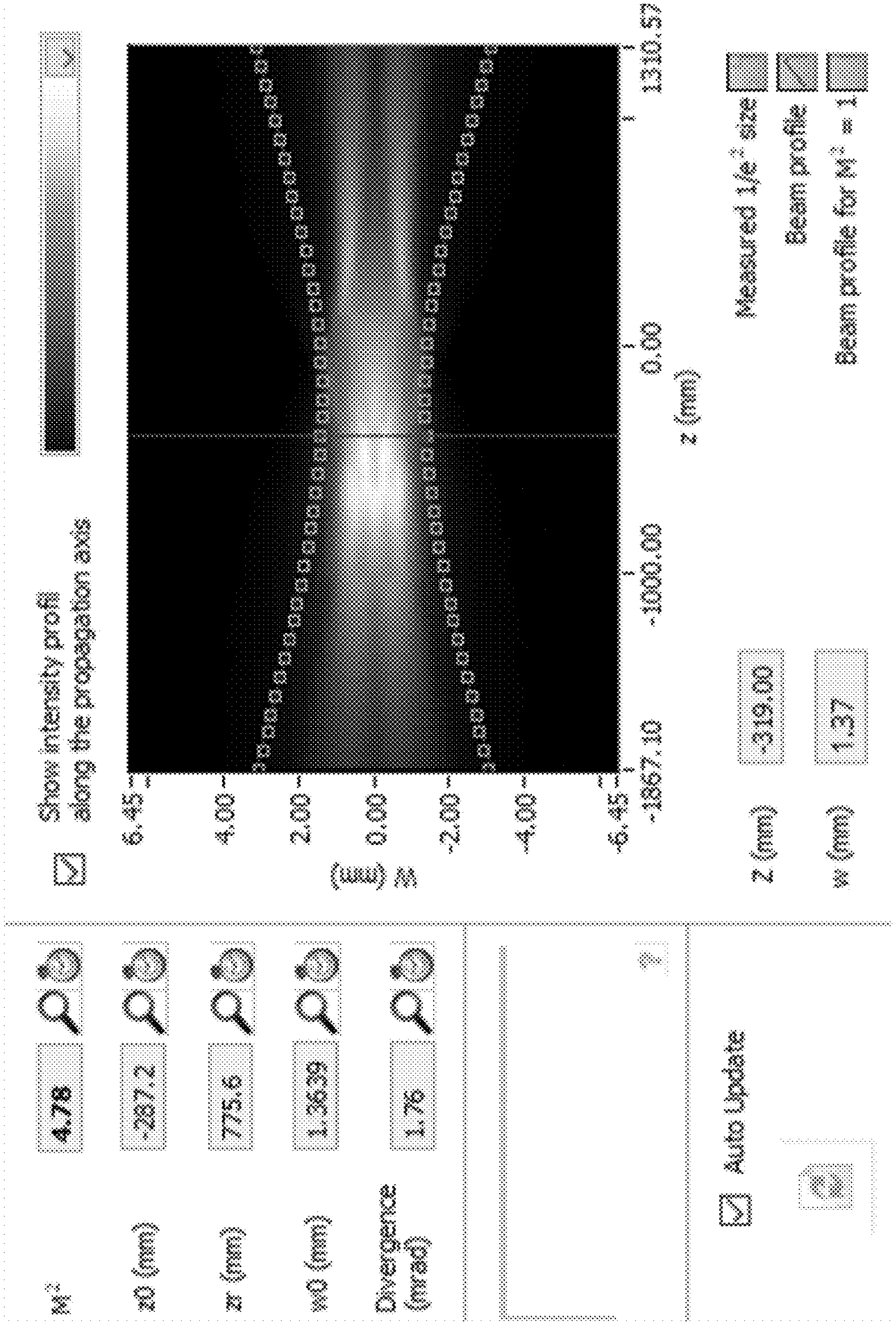
FIG. 13 illustrates an exemplary intensity axial distribution of a laser beam along a propagation axis at a beam waist with an M-square ($M^2$) value of 4.78, in accordance with an embodiment of the present disclosure.
Figure 14:
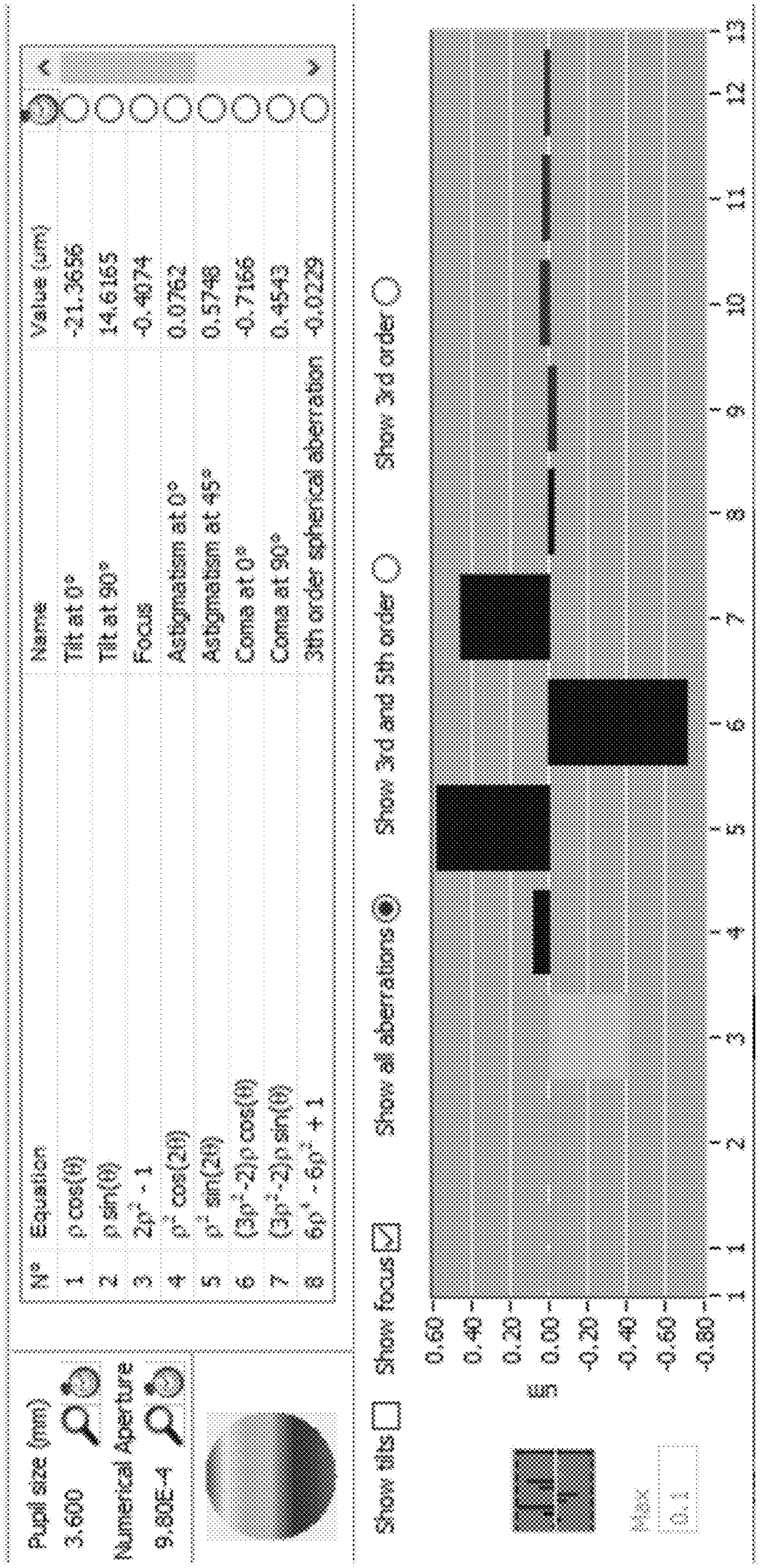
FIG. 14 illustrates exemplary coefficients of Zernike polynomials, in accordance with an embodiment of the present disclosure.
Figure 15:
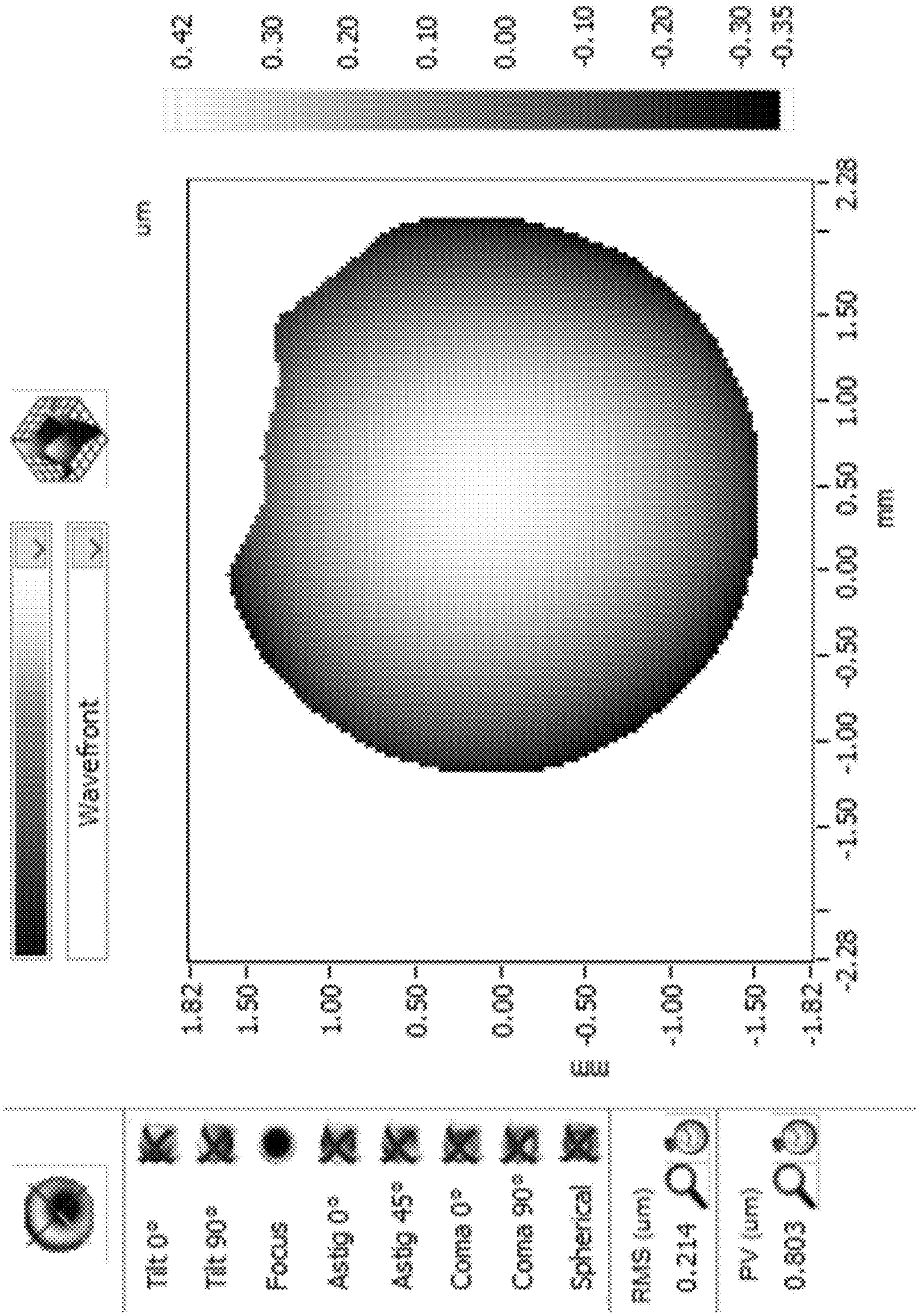
FIG. 15 illustrates an exemplary wave front defocus terms of Zernike polynomials, in accordance with an embodiment of the present disclosure.
Figure 16:
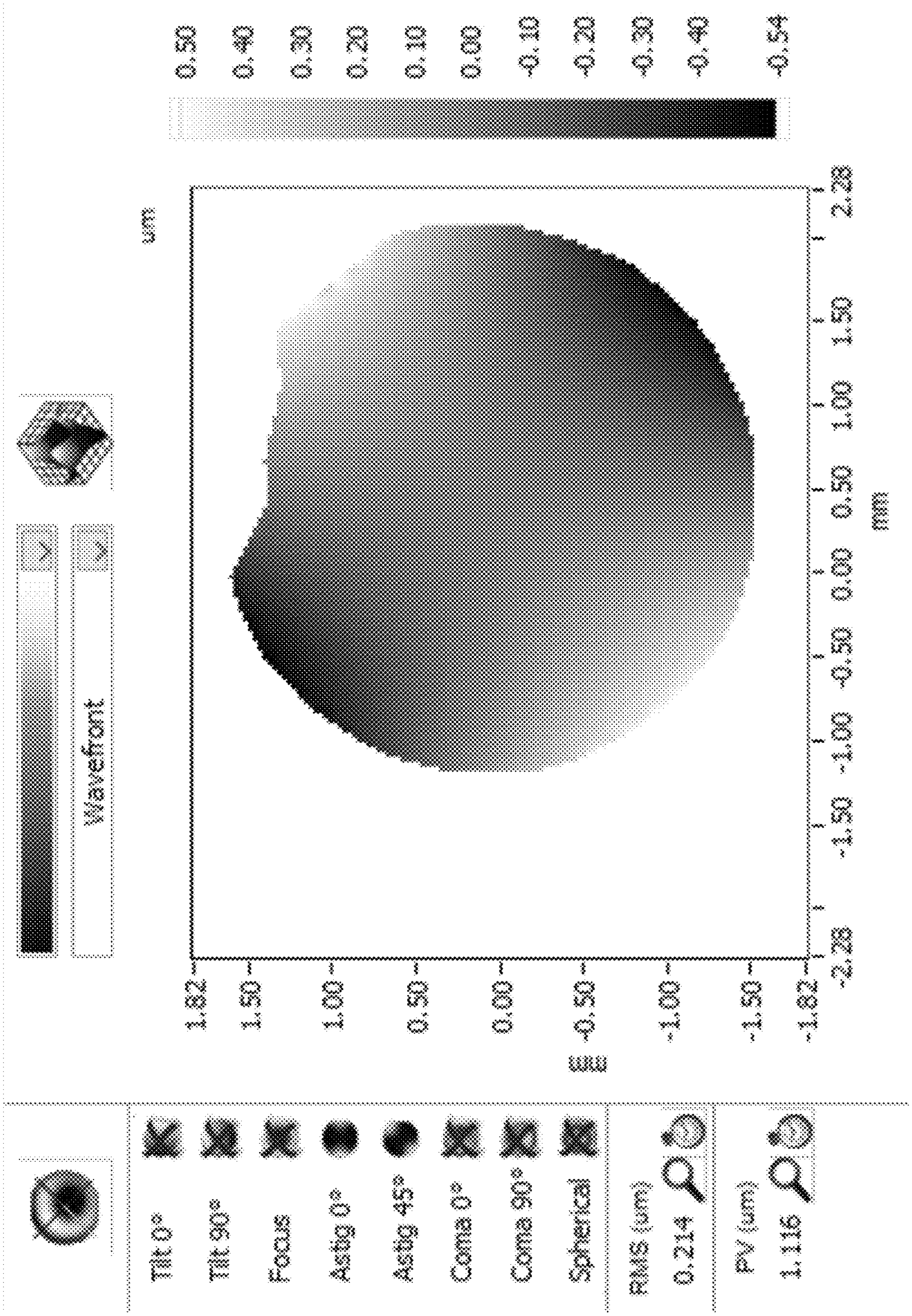
FIG. 16 illustrates exemplary wave front astigmatism values of Zernike polynomials, including astigmatism 0 degree and astigmatism 45 degree, in accordance with an embodiment of the present disclosure.
Figure 17:
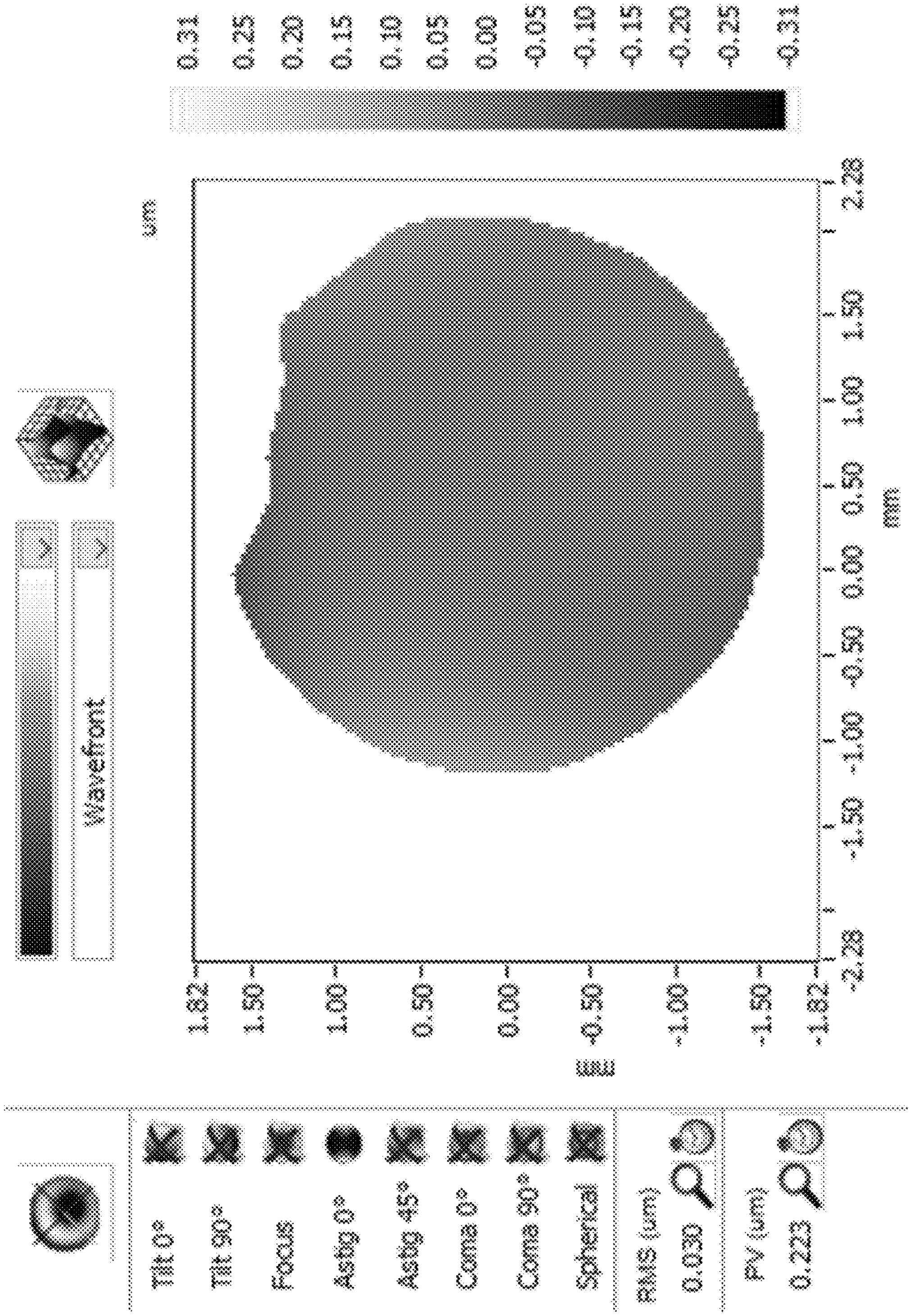
FIG. 17 illustrates an exemplary wave front astigmatism at 0° of Zernike polynomials, in accordance with an embodiment of the present disclosure.
Figure 18:
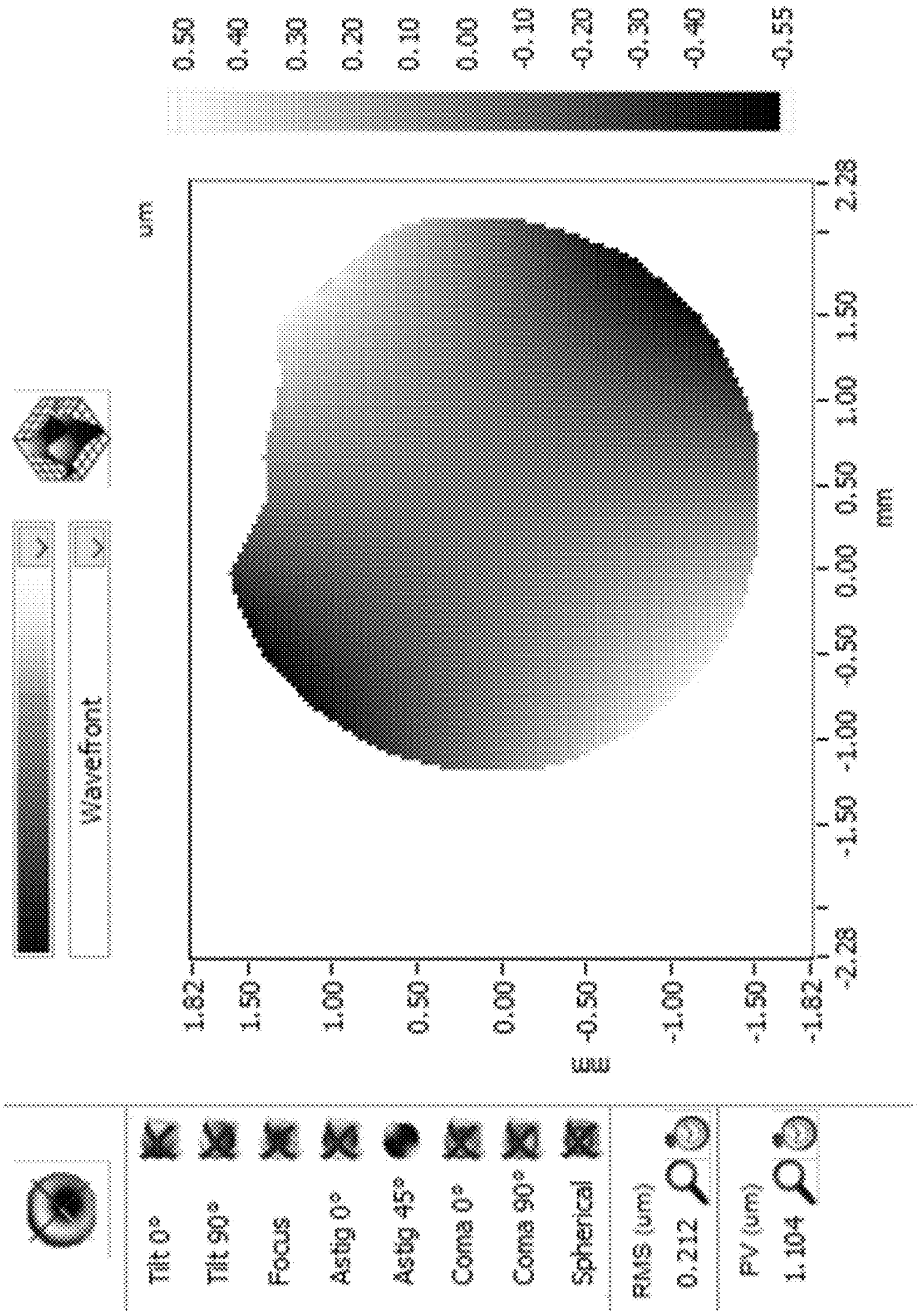
FIG. 18 illustrates an exemplary wave front astigmatism at 45° of Zernike polynomials, in accordance with an embodiment of the present disclosure.
Figure 19:
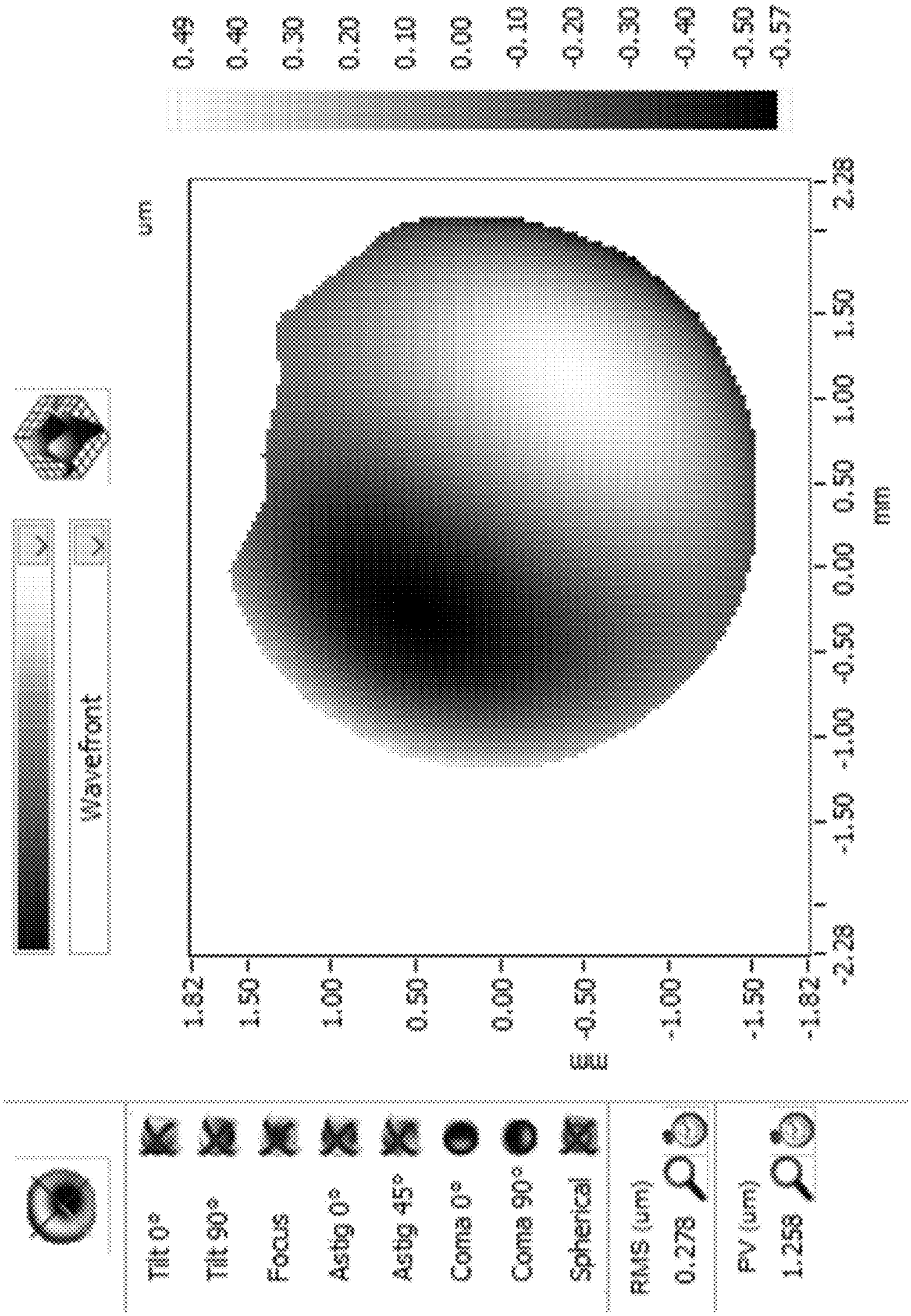
FIG. 19 illustrates an exemplary wave front coma term of Zernike polynomials, which include coma 0 degree and coma 45 degree, in accordance with an embodiment of the present disclosure.
Figure 20:
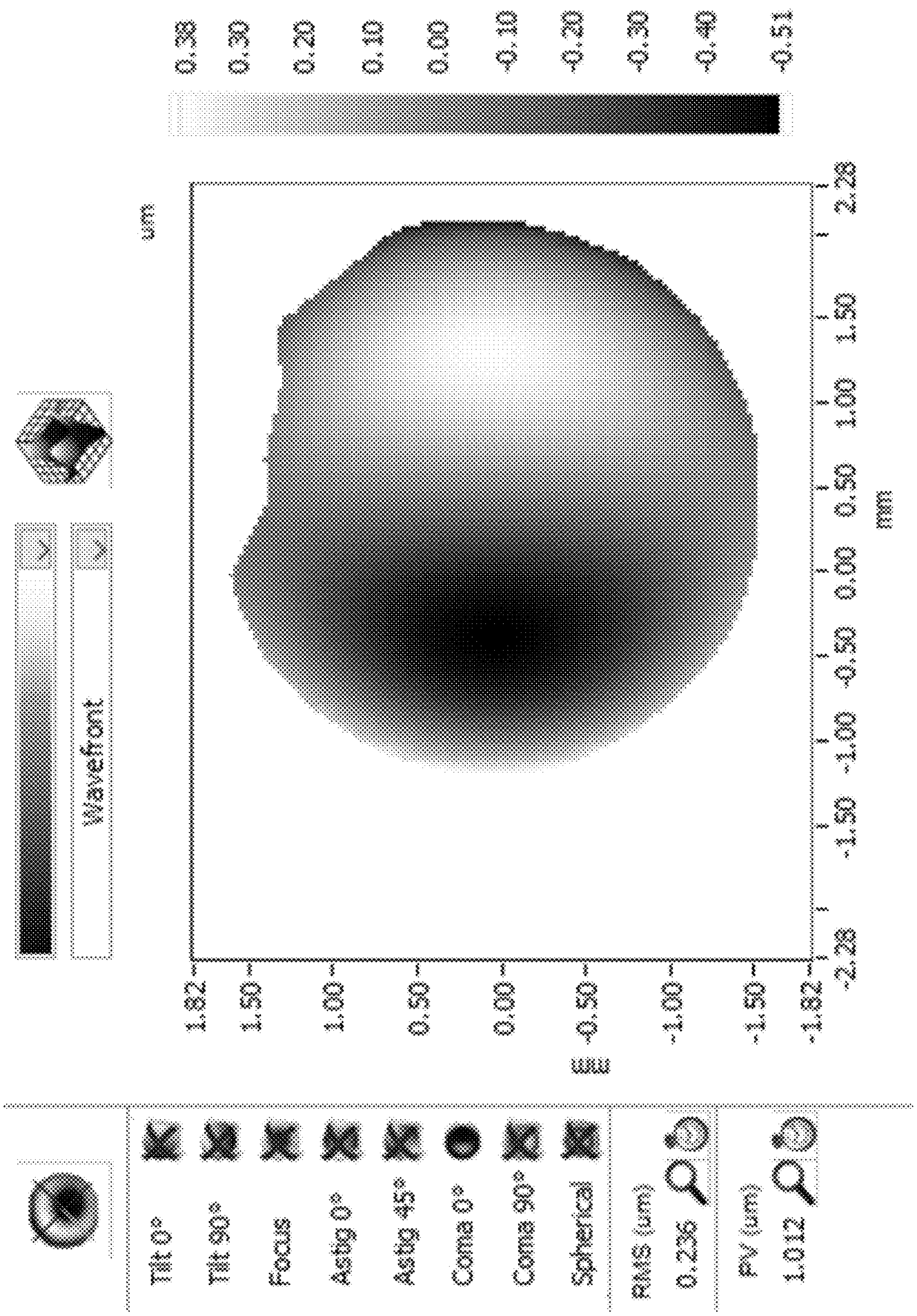
FIG. 20 illustrates an exemplary wave front coma at 0° of Zernike polynomials, in accordance with an embodiment of the present disclosure.
Figure 21:
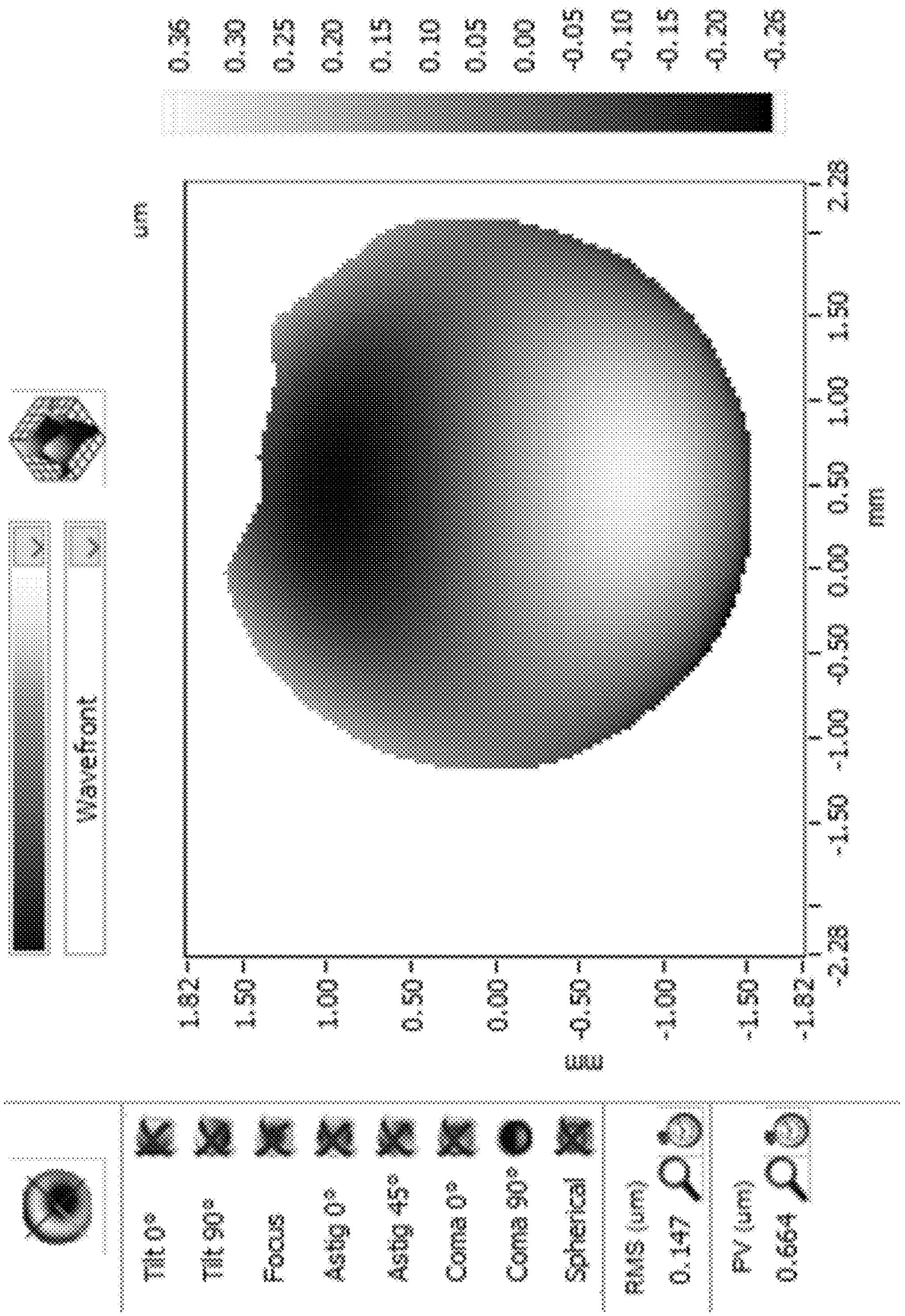
FIG. 21 illustrates an exemplary wave front coma at 90° of Zernike polynomials, in accordance with an embodiment of the present disclosure.
Figure 22:
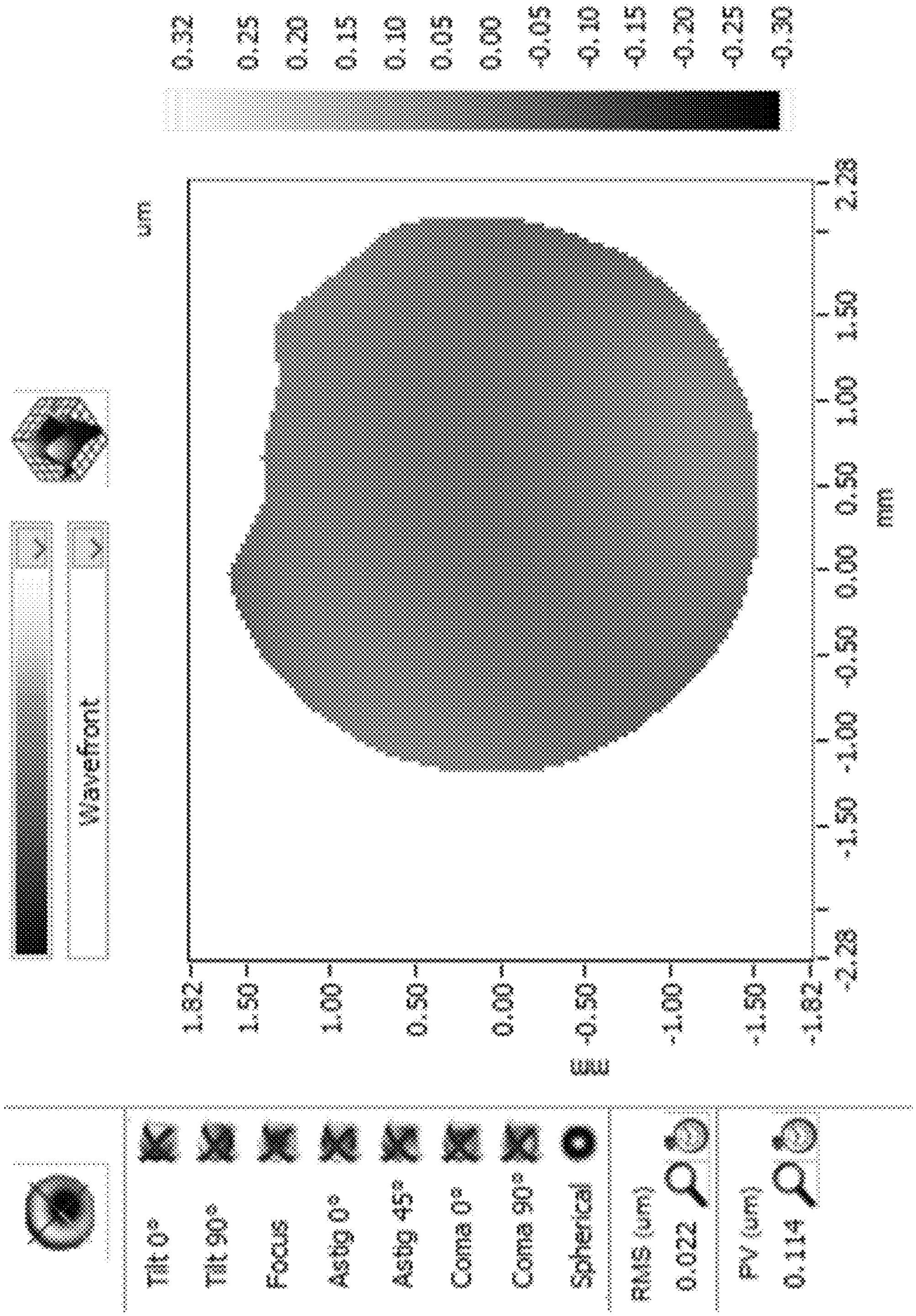
FIG. 22 illustrates exemplary wave front 3rd order spherical aberrations of Zernike polynomials, in accordance with an embodiment of the present disclosure.

With the prototype system developed for intermediate NA metrology, we performed a wave front phase measurement of a 1577 EML laser diode chip on carrier (CoC). FIG. 9 shows a 1577 EML laser diode chip on the slot that is ready for testing. FIG. 10 shows the beam intensity measured at the wave front testing pupil. We can see that the intensity has an approximate Gaussian distribution profile. FIG. 11 shows the laser diode wave front phase measured at the testing pupil. FIG. 12 is the point spread function (PSF) computed from wave front phase measurement of laser diode, which would otherwise be the intensity distribution at the end of an optical fiber for coupling in Optical Sub-Assembly (OSA). Given the PSF function, the Strehl ratio of 0.284 can be obtained. FIG. 13 shows the axial distribution of intensity of laser beam along the propagation axis at the position close to the beam waist, from which the M-Square value of 4.78 can be obtained. FIG. 14 shows the coefficients of Zernike polynomials and the orientations of major wave front aberration components of the diode laser beam, which include wave front alignment errors (tilts and defocus), spherical aberrations, astigmatisms, comas, etc. From this plot, it is apparent that the dominant wave front aberrations are astigmatism and coma. FIG. 15 shows the plot of defocus term, which is 0.214 micron RMS and 0.803 micron PV. FIG. 16 shows the astigmatism term, which is 0.214 micron RMS and 1.116 micron PV. The astigmatism term can be further decomposed into astigmatism at 0 degree (0.030 micron RMS, 0.223 micron PV) (FIG. 17) and astigmatism at 45° (0.212 micron RMS and 1.104 micron PV) (FIG. 18). FIG. 19 shows the plot of coma term (0.278 micron RMS, 1.258 micron PV), which can be further decomposed into coma at 0 degree (0.236 micron rms, 1.012 micron PV, (FIG. 20) and coma at 90 degree (0.147 micron rms, 0.664 micron PV, FIG. 21). FIG. 22 shows the plot of 3rd order spherical aberrations, which is 0.022 micron in rms and 0.114 micron PV.

The wave front residual error after removing the 1-12 Zernike terms is showed in FIG. 23, which is 0.137 micron RMS and 1.02 micron PV. The residual error also includes the zonal residual error from modal estimation that cannot be fitted into Zernike coefficients, which is 0.088 micron RMS and 0.577 micron PV as showed in FIG. 24.

While the disclosure has been described, disclosed, illustrated and shown in various terms of certain embodiments or modifications which it has presumed in practice, the scope of the disclosure is not intended to be, nor should it be deemed to be, limited thereby and such other modifications or embodiments as may be suggested by the teachings herein are particularly reserved.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible considering the said teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the said-described embodiments, but instead is defined by the appended claims considering their full scope of equivalents.

The invention claimed is:

1. An inspection device including a light source configured to emit a test beam, for qualifying the light source for use in an optical transmitter subassembly of an optical transceiver, the subassembly being arranged to collect and collimate light from the light source at a given numerical aperture (NA) and to converge the collimated light into an optical transmission system, the inspection device comprising:

(a) the light source configured to emit the test beam;

(b) a collecting lens system configured to collect and collimate light from the light source with an NA replicating the NA of an optical sub-assembly (OSA) system forming part of the transmitter subassembly, and to focus the collimated light to a focal point;

(c) a collimation lens configured to receive the focused light, resize and/or re-collimate the light, and match a resulting beam size to a detector of a wave front sensor; and (d) the wave front sensor having the detector, arranged to receive the re-collimated light and to measure wave front aberrations;

wherein the collecting lens system and the collimation lens, together with the wave front sensor, form an optical system having an exit pupil located at the detector of the wave front sensor and optically conjugated to an entrance pupil located at or near the collecting lens system; and wherein an optional field lens is positionable between the collecting lens system and the collimation lens to enhance image fidelity and improve radiometric efficiency.

2. The inspection device of claim 1, wherein the collimation lens is configured to re-collimate the light prior to incidence on the wave front sensor.

3. The inspection device of claim 1, wherein the wave front sensor comprises a Shack-Hartmann sensor, although other wave front phase measurement sensors may be used.

4. The inspection device of claim 1, wherein the collecting lens system collimates light from the light source prior to focusing the light through the focal point to replicate an OSA optical geometry, and the collimation lens re-collimates the light prior to the wave front sensor.

5. The inspection device of claim 1, further comprising a programmable processor configured with non-transitory code stored in memory for executing wave front analysis functions and for evaluating output of the wave front sensor to qualify the light source for use in the optical transmitter subassembly.

6. The inspection device of claim 1, wherein the optical transmission system includes the OSA and an optical fiber, and an NA at an entrance pupil of the OSA from the light source is replicated by the collecting lens system of the inspection device.

7. The inspection device of claim 1, wherein the collecting lens system comprises an aspheric or spherical lens, and a focusing lens comprises an aspheric or spherical lens configured to focus the collimated light to the focal point.

8. The inspection device of claim 1, wherein the light source comprises a laser diode (LD) or a light-emitting diode (LED).

9. The inspection device of claim 1, wherein the device is configured for measuring a selected NA and is implemented in one of the following configurations, in which a focal length of at least one optical element is permitted to vary within a tolerance range while maintaining the selected NA:

(a) Small NA configuration—measuring an NA of approximately 0.22, corresponding to a collection angle of about 25 degrees, comprising: (i) the collecting lens system comprising an aspheric lens having a nominal focal length of approximately 11 mm; and (ii) the collimation lens comprising either (1) a spherical singlet or a doublet lens, each having a nominal focal length of approximately 25 mm, or (2) a spherical singlet in combination with a field lens, (b) Intermediate NA configuration—measuring an NA in a range from approximately 0.23 to 0.29, corresponding to a collection angle of about 27 to 33 degrees, comprising: (i) an aspheric singlet having a nominal focal length of approximately 11 mm, serving as the collecting lens system; (ii) a spherical singlet serving as a focusing lens having a nominal focal length of approximately 45 mm; and (iii) a spherical singlet or a doublet serving as the collimation lens having a nominal focal length of approximately 25 mm, (c) Large NA configuration—measuring an NA in a range from approximately 0.53 to 0.58, corresponding to incident angles between about 65 and 71 degrees, comprising: (i) a high-NA aspherical single lens having a nominal focal length of approximately 10 mm; and (ii) an optical relay comprising either (1) a bi-convex spherical lens in combination with a plano-convex spherical lens, or (2) a plano-convex spherical lens in combination with a bi-convex spherical lens;

wherein each configuration forms an optical path analogous to an OSA collimation stage, thereby enabling wave front phase measurements under conditions representative of actual device operation, and optionally includes the field lens to ensure accurate pupil conjugation and enhance radiometric performance.

10. The inspection device of claim 1, wherein a focal length of at least one of the collecting lens system, the focusing lens, or the collimation lens is varied while maintaining the selected NA within the specified range for that configuration.

11. The inspection device of claim 1, wherein the collecting lens system comprises a reflective optical element, a catadioptric optical element, or a combination thereof, in place of or in addition to a refractive lens.

12. The inspection device of claim 1, further comprising an alignment subsystem including at least one of: (a) a position-adjustable lens mount; (b) a reference light source; and (c) a target pattern disposed at a pupil plane, configured to facilitate optical path alignment for accurate pupil conjugation.

13. The inspection device of claim 1, further comprising a calibration subsystem configured to inject a reference wave front into the optical path and to compare a measured wave front against a stored calibration profile to compensate for system aberrations.

14. The inspection device of claim 1, wherein the collecting lens system, the focusing lens, and the collimation lens are mounted in a thermally stabilized housing configured to maintain optical alignment under temperature variations.

15. The inspection device of claim 1, wherein the optical transmitter subassembly includes at least one of: a transmitter optical subassembly (TOSA), a receiver optical subassembly (ROSA), and a bidirectional optical subassembly (BOSA).

* * * * *